United States Patent
Peters

(10) Patent No.: US 8,946,596 B2
(45) Date of Patent: Feb. 3, 2015

(54) MULTIPLE WELDING USING A SINGLE POWER SOURCE

(75) Inventor: Steven R. Peters, Huntsburg, OH (US)

(73) Assignee: Lincoln Global, Inc., City of Industry, CA (US)

( * ) Notice: Subject to any disclaimer, the term of this patent is extended or adjusted under 35 U.S.C. 154(b) by 2180 days.

(21) Appl. No.: 11/538,874

(22) Filed: Oct. 5, 2006

(65) Prior Publication Data

US 2008/0083705 A1 Apr. 10, 2008

(51) Int. Cl.
*B23K 9/10* (2006.01)

(52) U.S. Cl.
CPC .................................... *B23K 9/1068* (2013.01)
USPC .................. 219/130.5; 219/130.1; 219/130.51

(58) Field of Classification Search
USPC ............................... 219/130.5, 130.1, 130.51
See application file for complete search history.

(56) References Cited

U.S. PATENT DOCUMENTS

| | | | |
|---|---|---|---|
| 4,246,463 A | 1/1981 | Shutt et al. | |
| 4,806,735 A | 2/1989 | Ditschun et al. | |
| 4,861,965 A | 8/1989 | Stava | |
| 4,866,247 A | 9/1989 | Parks et al. | |
| 4,947,021 A | 8/1990 | Stava | |
| 4,954,691 A * | 9/1990 | Parks et al. | 219/137 PS |
| 5,073,695 A * | 12/1991 | Gilliland | 219/130.31 |
| 5,155,330 A | 10/1992 | Fratiello et al. | |
| 5,225,660 A * | 7/1993 | Mita et al. | 219/130.51 |
| 5,278,390 A | 1/1994 | Blankenship | |
| 5,349,157 A | 9/1994 | Blankenship | |
| 5,351,175 A | 9/1994 | Blankenship | |
| 5,406,050 A * | 4/1995 | Macomber et al. | 219/130.1 |
| 5,715,150 A | 2/1998 | Stava | |
| 5,864,116 A | 1/1999 | Baker | |
| 6,002,104 A | 12/1999 | Hsu | |
| 6,023,037 A | 2/2000 | Church et al. | |
| 6,051,810 A | 4/2000 | Stava | |
| 6,177,645 B1 | 1/2001 | Church et al. | |
| 6,207,929 B1 | 3/2001 | Stava et al. | |
| 6,291,798 B1 | 9/2001 | Stava | |
| 6,486,439 B1 | 11/2002 | Spear et al. | |
| 6,600,134 B2 | 7/2003 | Stava | |
| 6,624,388 B1 | 9/2003 | Blankenship et al. | |
| 6,700,097 B1 | 3/2004 | Hsu et al. | |
| 6,717,108 B2 | 4/2004 | Hsu | |
| 6,723,957 B2 * | 4/2004 | Holverson et al. | 219/137 PS |
| 6,734,394 B2 | 5/2004 | Hsu | |
| 6,818,860 B1 * | 11/2004 | Stava et al. | 219/130.1 |
| 6,847,008 B2 | 1/2005 | Myers et al. | |

(Continued)

OTHER PUBLICATIONS

International Search Report and Written Opinion, PCT/US2007/064301, Feb. 14, 2008.

(Continued)

*Primary Examiner* — Henry Yuen
*Assistant Examiner* — Ayub Maye
(74) *Attorney, Agent, or Firm* — Hahn Loeser & Parks LLP

(57) ABSTRACT

Welding systems are presented, in which a single power source provides a first DC output to a plurality of digital waveform controlled chopper modules. Welding modules are also disclosed for converting an input DC signal to a welding signal, which are comprised of a down-chopper for providing a welding signal waveform according to a pulse width modulated switching signal, along with a digital waveform controller providing the switching signal according to a desired waveform.

16 Claims, 23 Drawing Sheets

(56) References Cited

U.S. PATENT DOCUMENTS

| | | |
|---|---|---|
| 6,855,912 B2 | 2/2005 | Houston et al. |
| 6,870,132 B2 | 3/2005 | Stava |
| 6,940,040 B2 | 9/2005 | Houston et al. |
| 7,105,773 B2 * | 9/2006 | Myers et al. ............. 219/130.51 |
| 7,173,214 B2 * | 2/2007 | Nadzam et al. .......... 219/130.51 |
| 2005/0224481 A1 | 10/2005 | Nadzam et al. |
| 2006/0037952 A1 | 2/2006 | Myers et al. |

OTHER PUBLICATIONS

Lincoln Electric, "Multi-Weld 350", Publication E5.302, Mar. 2005.
Lincoln Electric, "Multi-Weld 350 Arc Converter", Dec. 2003.

* cited by examiner

MULTIPLE WELDING USING A SINGLE POWER SOURCE

FIELD OF THE INVENTION

The present invention relates generally to arc welding, and more particularly to improved welding systems and portable welding modules for multiple welding using a single power source.

BACKGROUND OF THE INVENTION

Welding installations often involve multiple concurrent welding operations, with each welding operation being performed with one or more corresponding welding arcs. Typically, a welding power source is provided for each welding operation, where the power sources are each connected to AC input power supplies for providing welding arc power. These stand-alone welders include circuits with transformers and rectifiers to convert the supplied single or three-phase AC input power to a DC bus, typically around 50 to 120 volts DC, which is then applied to a control stage to create a signal suitable for establishing a welding arc. Many different forms of welder power sources have been developed, including inverter and chopper based designs that provide a welding signal waveform by selective switching of current from the DC bus. Examples of modern welding power source designs include POWERWAVE inverter-based products and POWERMIG chopper-based systems offered by the Lincoln Electric Company of Cleveland, Ohio. POWER MIG and POWER WAVE are registered trademarks of the assignee of the present invention. These welders provide control of the welder output waveform to enable advanced welding operations to control various parameters of a given welding application, where the waveforms can be designed using computer-based interface tools that communicate with a digital switching controller that operates the switching circuitry of the inverter or chopper stage following the initial AC-DC power conversion stage. Examples of these advanced welders and tools are shown in Blankenship U.S. Pat. No. 5,278,390; Hsu U.S. Pat. No. 6,002,104; Spear U.S. Pat. No. 6,486,439; Spear U.S. Pat. No. 6,624,388; Hsu U.S. Pat. No. 6,700,097; Hsu U.S. Pat. No. 6,717,108; and Hsu U.S. Pat. No. 6,734,394, which are incorporated by reference as background to the present invention. Advanced power sources commonly offer positive and negative outputs to support either polarity or variable polarity modules. The waveforms can be specified and saved in memory in the digital controller, and these welders can be configured to implement a wide range of welding operations. This advanced programmability has proved enormously successful in modern welding applications, allowing manufacturing and assembly processes to be optimized in a number of industries where workpieces are welded, and this technology has been widely offered in the market.

In many welding worksites, however, the power distribution may not be dispersed adequately to provide AC power at every location where a welder is required. In addition, the stand-alone welders are often heavy, typically well over 300 pounds, primarily due to the internal transformers and rectification components needed to convert the AC input power to a usable DC bus level from which a welding signal can be derived. Consequently, the welder (and hence the welding operation) must be located near a supply of AC electrical power, and an operator cannot easily relocate the welder. Distributed welding systems have been developed to operate multiple welding arcs from a large single AC-DC power source. In this manner, the AC supply is converted to a DC bus that is distributed by suitable cabling from the single AC-DC supply to a number of analog control modules that ultimately provide welding arc power to individual welding operations. In such distributed systems, the modules include a tapped resistor grid, with the output of each grid being adjusted by an operator to set the desired arc current (heat) for the corresponding welding process. In a common welding installation, the individual welding operations may require maximum arc current capabilities on the order of 300 amps or more, wherein the AC-DC supply typically provides a DC bus voltage of about 80 volts DC to the individual analog welding modules. Because several arcs may be simultaneously powered by the single AC-DC supply, the supply must be capable of maintaining adequate output voltage levels while supplying up to 1000 amps or more to the array of welding modules. In this regard, the resistive tap components make the individual modules energy inefficient, and the single AC-DC power source needs to be sized so as to provide the required welding currents with enough capacity to accommodate the module inefficiencies. As a result, higher levels of such system distribution require the AC-DC power source to be extremely large and heavy. Moreover, short circuit conditions in any one of the arcs provided by the analog control modules can cause loss of arc situations in other weld processes, due to the simple nature of the analog arc controls and the shared power source.

In early distributed welding systems, the efficiency and control capabilities of the individual weld modules were limited, due to the simple resistive tap arrangement, whereby advanced welding processes could not be undertaken in such prior distributed welding systems. To address the module inefficiency shortcomings, switching supplies have been developed for distributed welding systems, where a switching DC-DC converter module is used to provide the arc current in a multiple arc application. An example of this type of equipment is the Multi-Weld product line manufactured and sold by the Lincoln Electric Company of Cleveland, Ohio, with which any number of modules can be connected to a single DC power source to provide multiple welding arcs. The internal switching circuitry of these welding modules is conventionally controlled by dedicated analog control circuits configured for certain common welding operations, such as basic shielded metal arc welding (SMAW), gas-tungsten arc welding (GTAW), gas-metal arc welding (GMAW) or flux-cored arc welding (FCAW) processes. However, these systems do not offer the programmability and advanced control capabilities of the above mentioned waveform controlled stand-alone welders. Accordingly, there is a need for improved welding systems and apparatus by which advanced welding capabilities can be provided in welding situations where AC supply power is not widely distributed while allowing easy relocation and reconfiguration of equipment to different locations to perform different welding operations.

SUMMARY OF INVENTION

A summary of one or more aspects of the invention is now presented in order to facilitate a basic understanding thereof, wherein this summary is not an extensive overview of the invention, and is intended neither to identify certain elements of the invention, nor to delineate the scope of the invention. Rather, the primary purpose of the summary is to present some concepts of the invention in a simplified form prior to the more detailed description that is presented hereinafter. The present invention is related to programmable portable welding equipment that may facilitate the provision of distributed welding systems with advanced waveform control capabilities, where the apparatus may be easily reconfigured and relocated to support multiple welding operation types with maximum adaptability to changing worksite situations, by which the above-mentioned and other shortcomings of conventional welders can be mitigated or overcome. The invention contemplates the use of a single power source to convert supplied AC electrical power to an isolated DC signal or bus, together with two or more lightweight down-chopper type power converter modules, which include digital controllers providing switching control signals to the choppers to regulate the current provided to the respective welding processes. In this manner, the invention provides the advanced control and programmability advantages of modern stand-alone welders along with the portability and power distribution advantages of distributed welding systems in situations where AC power is not distributed around a welding site. The systems enabled by the present invention are therefor easily adaptable to changing welding site work requirements, where additional portable welding modules can be added to provide additional digitally controlled welding arcs as needed, limited only by the DC current capabilities of the DC power source. The invention thus facilitates provision of modular building blocks in advanced welding systems, allowing production managers and other welding professionals to configure an unlimited number of different systems according to a given welding production specification using modular digitally controlled welder "machines" that can be standardized for production, maintenance, and inventory reasons, with the capability to simply add another machine for each new arc required.

In accordance with one or more aspects of the invention, a welding system is provided, which allows performance of multiple welds through creation of a plurality of welding arcs and welding signals therefor, without requiring AC supply power at the location of each welding operation. The system includes two or more chopper-based welding modules and a power source that receives AC input power and provides a first DC output signal to the chopper modules. A first welding module includes a chopper DC-DC switching converter, which receives the first DC output signal and provides a first signal waveform suitable for welding comprised of a series of pulses that define the first waveform to establish a first welding arc according to a pulse width modulated (PWM) first switching signal. The module further includes a digital waveform controller providing the PWM signal to the chopper according to a desired first waveform. The system also includes one or more additional welding modules individually comprising a digital waveform controller and a chopper receiving the first DC output signal from the power source and providing a welding signal waveform according to a PWM signal from the associated digital controller. One or more of the welding modules may be coupled with additional components in the system, which components may be integrated into the chopper module, such as a short circuit welding control module that senses an anticipated metal breaking fuse condition in a short circuit welding process and controls the welding signal accordingly, and/or a polarity switching circuit to facilitate AC welding or different welding operations requiring different electrical current polarities. In other embodiments, the system may include a synchronizing controller that synchronizes the digital waveform controllers, where the synchronizing controller may be integrated into one of the welding modules. In one implementation, the chopper welding modules can provide rated maximum output currents of about 300 amps or more while still being portable, wherein the welding modules in one example weigh about 100 pounds or less, thereby facilitating ease of relocation and system reconfiguration.

Another aspect of the invention relates to welding systems including a power source with positive and negative output terminals, as well as a center tapped or offset tapped ground terminal at a voltage between the output terminal voltages. The system further comprises a first chopper coupled to the positive output terminal and a first digital waveform controller providing a PWM switching signal to the first chopper according to a desired first waveform, as well as a second chopper coupled to the negative output terminal of the power source with a corresponding second digital waveform controller, and a synchronizing controller operative to synchronize the first and second digital waveform controllers. In one possible embodiment, the first chopper and the first digital waveform controller are integrated into a first welding module, with the second chopper and the second digital waveform controller being integrated to form a second module, where the synchronizing controller can be integrated into one of the welding modules. In the implementations below, the integrated modules are constructed to weigh about 100 pounds or less while having maximum current ratings of about 300 amps or more, whereby the individual machines or building blocks are portable. In another exemplary implementation, a single module or machine is provided through integration of the first and second chopper converters, the first and second digital waveform controllers, and the synchronizing controller. In this manner, a modular system is provided to implement advanced TIG welding operations in which positive and negative welding waveforms are required. In one implementation, the chopper converters are each rated for maximum currents of about 300 amps or more.

In accordance with yet another aspect of the invention, a welding chopper module is provided for converting an input DC signal to a welding signal for performing a welding process. The module is comprised of a chopper, with a DC input and a switching circuit for providing a first electrical welding signal waveform according to a pulse width modulated signal, as well as a digital waveform controller providing the PWM signal according to a desired waveform. In one embodiment, the module is capable of providing maximum rated currents of about 300 amps or more, and is lightweight, having a weight under about 100 pounds. A synchronizing controller may be integrated in the module to synchronize the internal digital waveform controller with another digital waveform controller, such as that of another similar chopper module. In another embodiment, the module further includes a second chopper having an input for receiving a DC signal from an external power source, and a switching circuit, as well as a corresponding digital waveform controller for providing a second welding signal waveform, with the synchronizing controller being adapted to synchronize the first and second digital waveform controllers of the module.

BRIEF DESCRIPTION OF THE DRAWINGS

The following description and drawings set forth certain illustrative implementations of the invention in detail, which are indicative of several exemplary ways in which the principles of the invention may be carried out. Other objects, advantages and novel features of the invention will become apparent from the following detailed description of the invention when considered in conjunction with the drawings, in which.

DETAILED DESCRIPTION OF THE INVENTION

Figure 1:
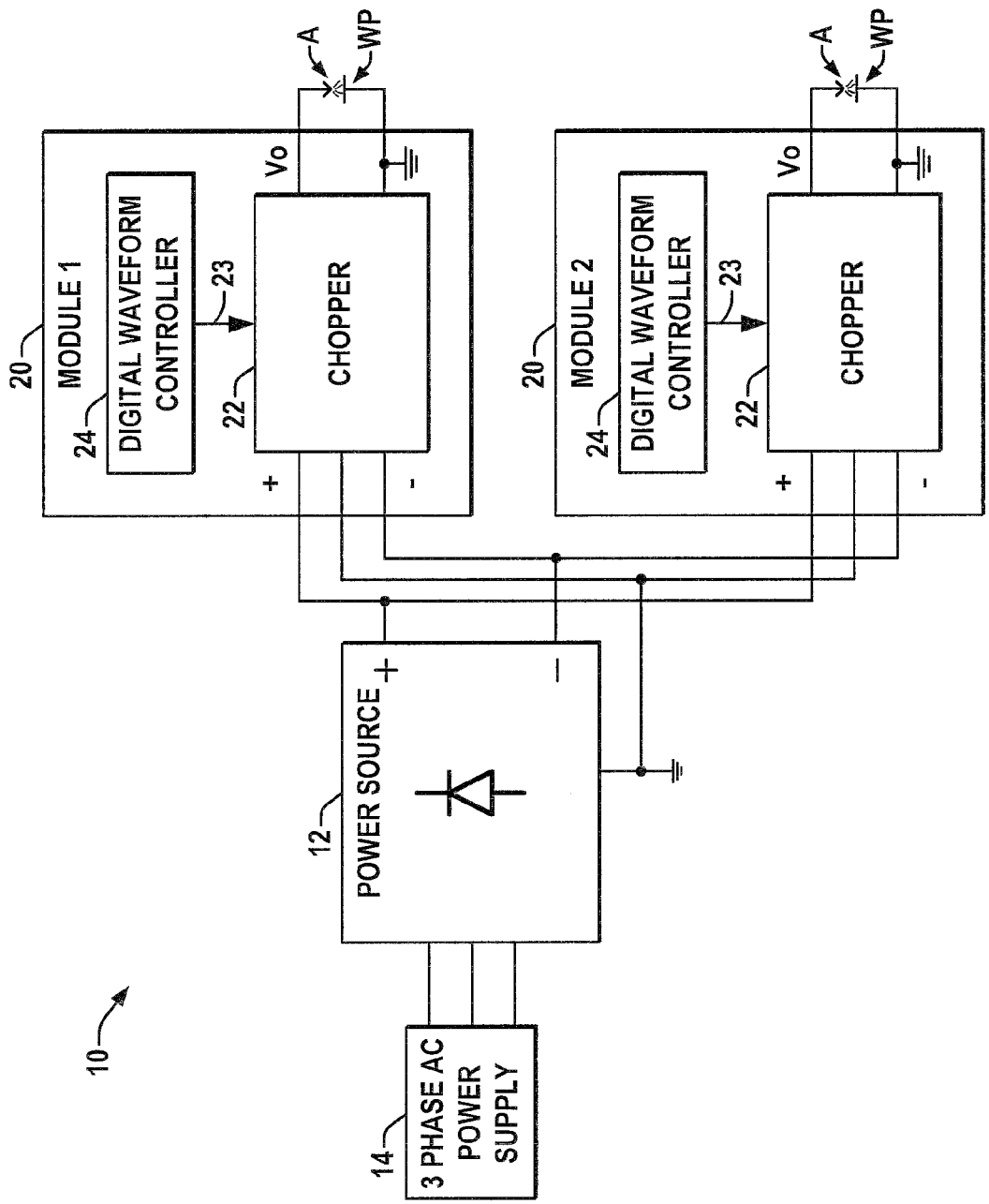
FIG. 1 is a simplified schematic diagram illustrating an exemplary welding system having two digitally controlled chopper-based welding modules and a single power source in accordance with various aspects of the present invention.

Referring now to the figures, several embodiments or implementations of the present invention are hereinafter described in conjunction with the drawings, wherein like reference numerals are used to refer to like elements throughout and wherein the illustrated structures are not necessarily drawn to scale. The following embodiments illustrate the inventive concept of combining a single power source with a number of digitally controlled, portable, chopper modules that each control the output current to an associated arc in a multiple arc welding system, as well as the use of two such modules to provide switchable polarity welding systems. A digital controller is integrated in each chopper module to regulate the current provided to the associated weld operation via a pulse width modulated control signal generated according to feedback from the welding process and a desired welding waveform using advanced waveform control technology.

FIG. 1 illustrates an exemplary distributed welding system 10 in accordance with various aspects of the present invention, wherein a single power source 12 provides an isolated and unregulated DC output signal or DC bus to first and second digitally controlled welding chopper modules 20. Power source 12 receives single or multi-phase AC input power from a power supply 14, and includes various transformer and rectifier components (not shown) by which the input AC power is converted to the DC power source output, wherein the output power of power source 12 is unregulated with respect to the welding operations being performed with the system 10. In this regard, the power source output DC may be controlled or regulated according to some other desired technique unrelated to welding processes, for example, to provide a regulated constant output voltage such as about 50 to 120 volts DC in one example. Power source 12, moreover, may be of any suitable power conversion architecture, including a simple transformer/rectifier design, inverter, etc., wherein the power source components are sized such that the power source 12 has sufficient output current capability so as to provide adequate input DC power to two or more chopper modules 20 for performing one or more welding operations therewith. In the illustrated embodiments, power source 12 is capable of providing currents in excess of 1000 amps to supply several modules 20 with operating maximum output currents of about 300 amps or more, although the current output capability and output voltage range of power source 12 are not strict requirements in the systems of the invention. Moreover, power source 12 may receive input power from any suitable power supply, including but not limited to single or three-phase AC power supplies provided at a welding site, gas or diesel generators or alternators, steam turbines, gas turbine engine generator/alternator systems (FIG. 2A below), fuel cells, large inverter power sources, etc.

Figure 1A:
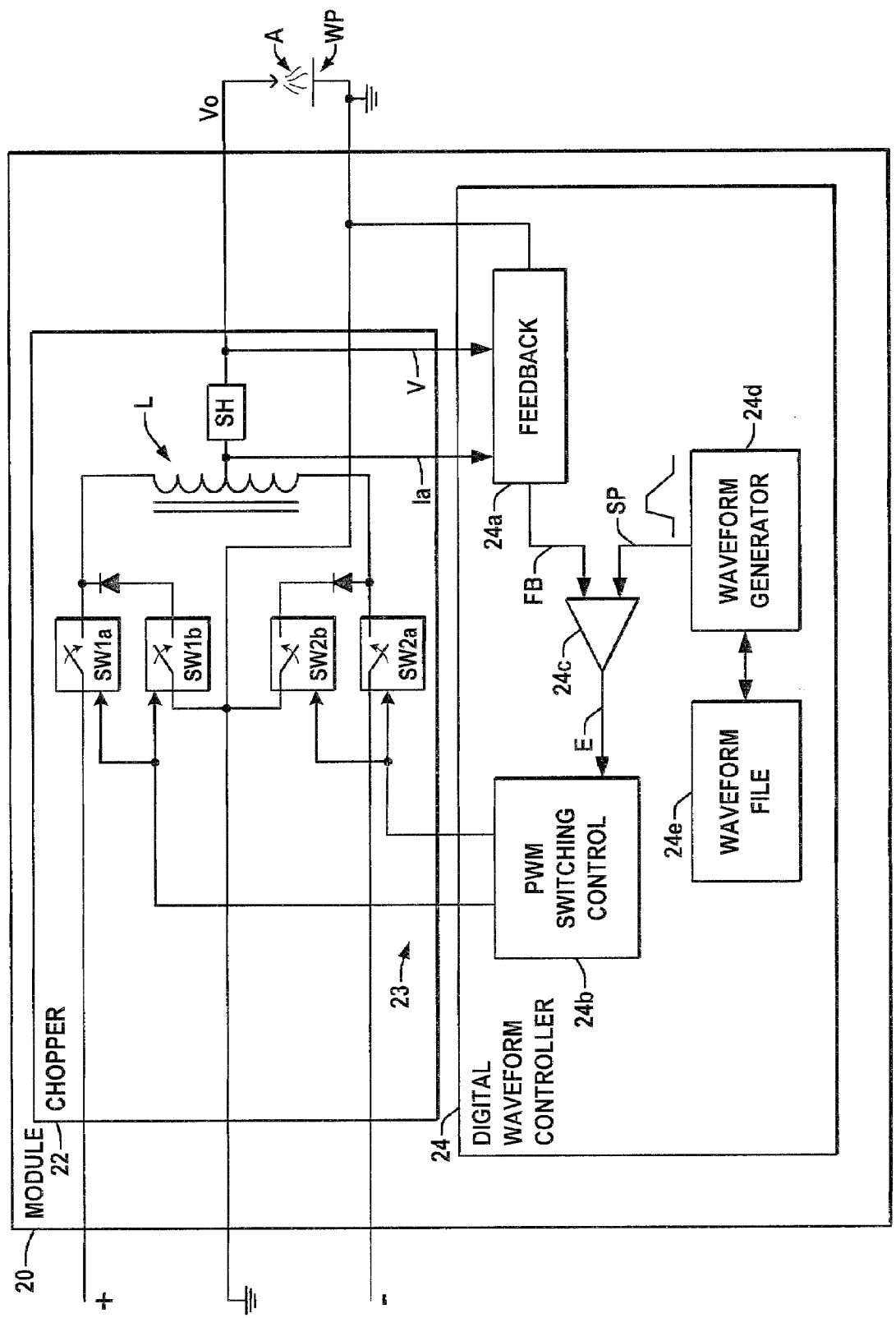
FIG. 1A is a detailed schematic diagram illustrating an exemplary welding module with an AC chopper-type switching converter and a digital waveform controller according to the invention.
Figure 1B:
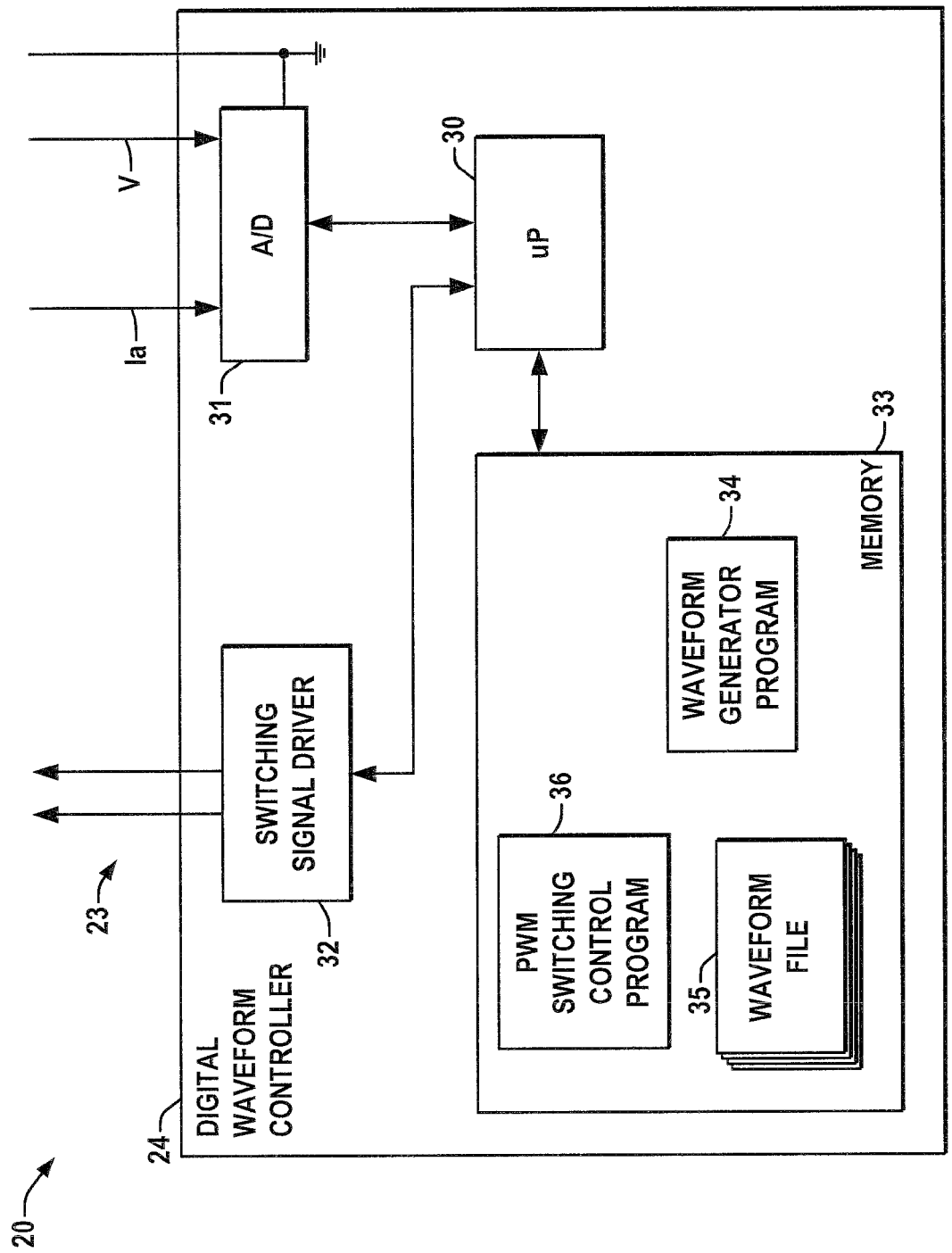
FIG. 1B is a schematic diagram illustrating one software based embodiment of a digital waveform controller in accordance with the invention.
Figure 1C:
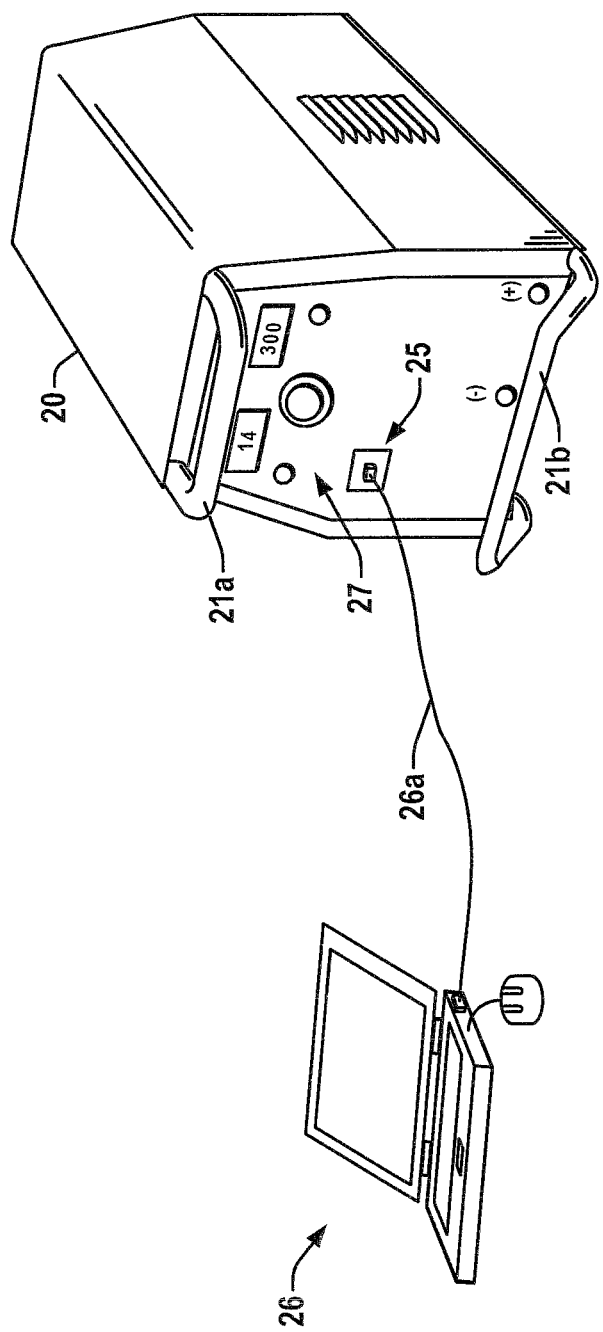
FIG. 1C is a perspective view illustrating an exemplary lightweight chopper-based welding module programmable using computer-based waveform design tools in accordance with the invention.

Referring now to FIGS. 1-1C, modules 20 are coupled directly or indirectly via cables or other electrical interconnection apparatus to receive the DC output signal provided by power source 12, as shown in FIG. 1. In certain embodiments shown in the figures, modules 20 are depicted as having two DC input terminals coupled to the two output terminals of power source 12, respectively, although this is not a strict requirement of the invention. Other implementations are possible, for example, in which only one output terminal of the power source 12 is connected (directly or through appropriate DC bus distribution boxes or equipment) to each module 20. In this regard, current return paths may be established directly from a welding process to power source 12 through separate cabling or other interconnections, such as a dedicated workpiece cable connecting a welded workpiece WP to a terminal of power source 12, wherein the return current associated with a given welding process may, but need not, need not be returned to power source 12 through chopper module(s) 20.

FIG. 1A schematically illustrates an exemplary welding chopper module 20 in accordance with certain aspects of the invention and FIG. 1C shows a perspective view of the module 20 housed in a portable enclosure with handles 21a and 21b for ease of transport, wherein the exemplary chopper module 20 can provide maximum rated welding currents of about 300 amps or more and weighs less than about 100 pounds and is thus easily repositioned by a single person. As best shown in FIGS. 1 and 1A, chopper module 20 includes a down-chopper type DC to DC converter (chopper) 22 and an integrated digital waveform controller 24 coupled to chopper 22, with chopper 22 and digital controller 24 being enclosed within a single enclosure. The chopper 22 can be any type of switching dc to dc converter, preferably a down-chopper which generates a regulated output signal suitable for welding based on one or more pulse width modulated (PWM) switching control signals 23 provided by the digital controller 24. In one embodiment shown in FIG. 1A, chopper 22 is an AC chopper receiving positive and negative input DC voltages from source 12 and providing output DC at a lower voltage, either positive or negative, via a selected one of two transistor switch sets SW1a, SW1b, and SW2a, SW2b, as well as an inductor L, and a pair of switch controlled freewheeling diodes, where the switches SW1 are controlled by a first PWM signal 23 from controller 24 for supplying positive current to establish and maintain a welding arc A and switches SW2 are controlled according to another PWM signal 23 for supplying negative current. In operation, chopper 22 receives the DC output signal from source 12 and provides an electrical welding signal waveform comprising a rapid succession of individual pulses that define the output waveform (e.g., current, voltage, etc.) to establish the welding arc A in a welding process (FIG. 1) according to the pulse width modulated switching signals 23 from the controller 24. Several suitable chopper architectures are illustrated and described in U.S. Pat. No. 6,600,134 to Stava entitled POWER SUPPLY FOR ELECTRIC ARC WELDING, the entirety of which is hereby incorporated by reference as if fully set forth herein. In other possible embodiments, single polarity choppers 22 may be employed, whether positive or negative polarity, alone or in combination, for example, as illustrated and described in FIGS. 10B and 10C below.

The exemplary AC chopper 22 of FIG. 1A also includes a feedback shunt (e.g., resistor) SH to provide an arc current feedback signal Ia along with an arc voltage feedback signal V to digital controller 24. The AC chopper circuitry shown in FIG. 1A is merely one suitable example of a chopper that can be employed in a welding module of the invention. In this regard, other suitable choppers may be constructed using any suitable switching circuitry and components to achieve transformerless DC to DC conversion with no intervening AC signals according to one or more PWM control signals 23, wherein all such alternate implementations are contemplated as falling within the scope of the invention and the appended claims. Chopper module 20 is essentially a self-contained intelligent converter adapted to receive only input power from source 12 with digital control signaling and welding process feedback measurements being obtained internally. Module 20 has one or two input terminals for receiving the DC output signal from power source 12, wherein the negative (−) terminal and the return path shown from the anode of freewheeling diode D in FIG. 1A may be omitted in certain implementations where an alternative return path is provided between a welding process and the power source 12.

As shown in FIG. 1A, digital waveform controller 24 receives current and/or voltage feedback signals Ia and V from chopper 22 and operates in closed loop fashion to generate one or both of the PWM control signal(s) 23 based on the current chopper output and a desired output waveform. A digital waveform controller 24 may be any suitable component, system, or combination of systems by which one or more pulse width modulated switching control signals 23 are generated using digital processing, whether logic, code, or combinations thereof, based on a desired welding signal waveform, wherein feedback 24a may, but need not, be employed in the control signal generation. FIG. 1A shows a schematic-style illustration of the basic functional operation of the controller 24, although the functions described herein can be implemented in any digital form, including but not limited to microprocessor based systems with operating firmware, software, and/or in hardware or combinations thereof by which one or more PWM control signals 23 are provided, at least in part, in accordance with a desired waveform. Other possible implementations may include, for instance, digital and analog hardware components with digital logic (programmable or otherwise) used to generate the PWM control signal 23 according to a desired waveform, DSPs and associated circuitry with suitable firmware, hardware, microcode, etc. to implement the digital waveform functions outlined herein. The representations in FIG. 1A are merely illustrative of suitable software and/or hardware implementations of the described functionality thereof, wherein one suitable microprocessor-based digital controller implementation is depicted in FIG. 1B.

The process signals Ia and V are provided to a feedback component 24a in the embodiment of FIG. 1A, which in turn provides one or more feedback signals FB, for example, representing the present chopper output current, voltage, power, etc., or functions thereof, such as integrals (e.g., energy), derivatives, or other functions of measured process variables relating to the current condition of a welding arc A established by the chopper output power or the associated welding process generally (e.g., heat of workpiece WP). Controller 24 may also receive process signals or information from external devices or sensors, for example, synchronization control signals from other system components, wire feed speed values related to the associated weld process, etc. Moreover, module 20 may include a user interface and/or may include control and communications interface hardware and/or software by which one or more process setpoints or other information may be provided to the digital controller 24, for example, a desired welding current amplitude or other weld process operating point (workpoint).

Controller 24 also implements a PWM switching control function 24b that provides a pulse width modulated control signal 23 according to an error signal E representing the difference between a desired welding signal waveform and the actual welding signal at a given time. In this closed loop logical implementation, a comparator function 24c is implemented to compare the feedback signal(s) FB with a setpoint SP dictated by a waveform generator function 24d according to a desired signal waveform obtained from a waveform file 24e, wherein the desired waveform file 24e may be stored in a memory or other data store within module 20 or otherwise accessible by controller 24, and may be selectable from a number of programmed waveform files. In this regard, for microprocessor or logic-based controllers 24, the desired waveform may be stored in any suitable file structure, and may be representable in the form of a state table or one or more graphical representations (e.g., curves, graphs, etc.) for programming and/or modification by a user, wherein module 20 may include a communications interface 25 (FIG. 1C) for operative connection of a computer or other processing device 26 directly (using a cable 26a) or indirectly (such as through a network or other communications medium) which provides programming tools for defining, modifying, and/or otherwise configuring a desired waveform for use by the digital controller 24. In addition, modules 20 may include one or more user interface devices 27 accessible by a user to set one or more setpoint values, select desired waveforms, and/or to display one or more process values or settings, including but not limited to knobs, buttons, lights, graphical or numeric displays, etc. The waveform generator component 24d (FIG. 1A) provides a setpoint value SP at any given time in accordance with the selected desired waveform file 24e, which is then compared with the current feedback process value(s) FB by comparison function 24c to yield the error signal value E, which in turn is used by the PWM switching control component 24 in deriving the control signal(s) 23. In this manner, as the current chopper output changes due to process variations, and/or as the setpoint value changes according to a desired waveform profile (whether AC or DC), the error signal E will regulate the output signal Vo to conform to the desired waveform (e.g., closed loop pulse width modulated welding waveform control).

FIG. 1B illustrates one suitable microprocessor-based implementation of a digital waveform controller 24 in accordance with the invention, including a microprocessor 30 to execute program instructions of a waveform generator program 34 stored in a memory 33 according to a selected waveform file 35, also stored in memory 33. Processor 30 also executes a PWM switching control program or routine 36 in conjunction with the waveform control program 34 to provide the functionality of the waveform generator 24d, comparator 24c, and PWM switching control 24b in FIG. 1A above. This exemplary embodiment of the controller 24 also includes an analog to digital (A/D) circuit 31 (FIG. 1B) which comprises various analog and digital circuitry for receiving one or more process feedback (e.g., sensed) signals Ia, V, etc., and for providing corresponding digital values therefor to the microprocessor 30 for use in comparing the desired waveform value to the actual process value, whether current, voltage, or both, or derivatives, integrals, or other functions thereof, during execution of the waveform generator program 34. Switching signal driver circuitry 32 is also provided in digital waveform controller 24 to which one or more signals are provided by microprocessor 30, and by which the PWM control signal or signals 23 is/are generated for use in actuating one or more switches of chopper 22 (e.g., switches SW1a, SW1b, SW2a, and SW2b in the embodiment of FIG. 1A). The digital controller 24 may be integrated with chopper 22 in any suitable fashion, for instance, with circuit boards and associated components thereof being housed in a common enclosure (FIG. 1C) together with any necessary cabling operationally connecting chopper 22 to one or more terminals to receive the DC signal from power source 12, one or more output terminals to couple the resulting welding signal output of chopper 22 to a welding process, interfaces for providing external communications or signaling between digital controller 24 and external devices (e.g., computer 26 in FIG. 1C), power and signal conditioning circuitry for powering logic or processor circuit boards and analog conversion circuits, etc.

Figure 1D:
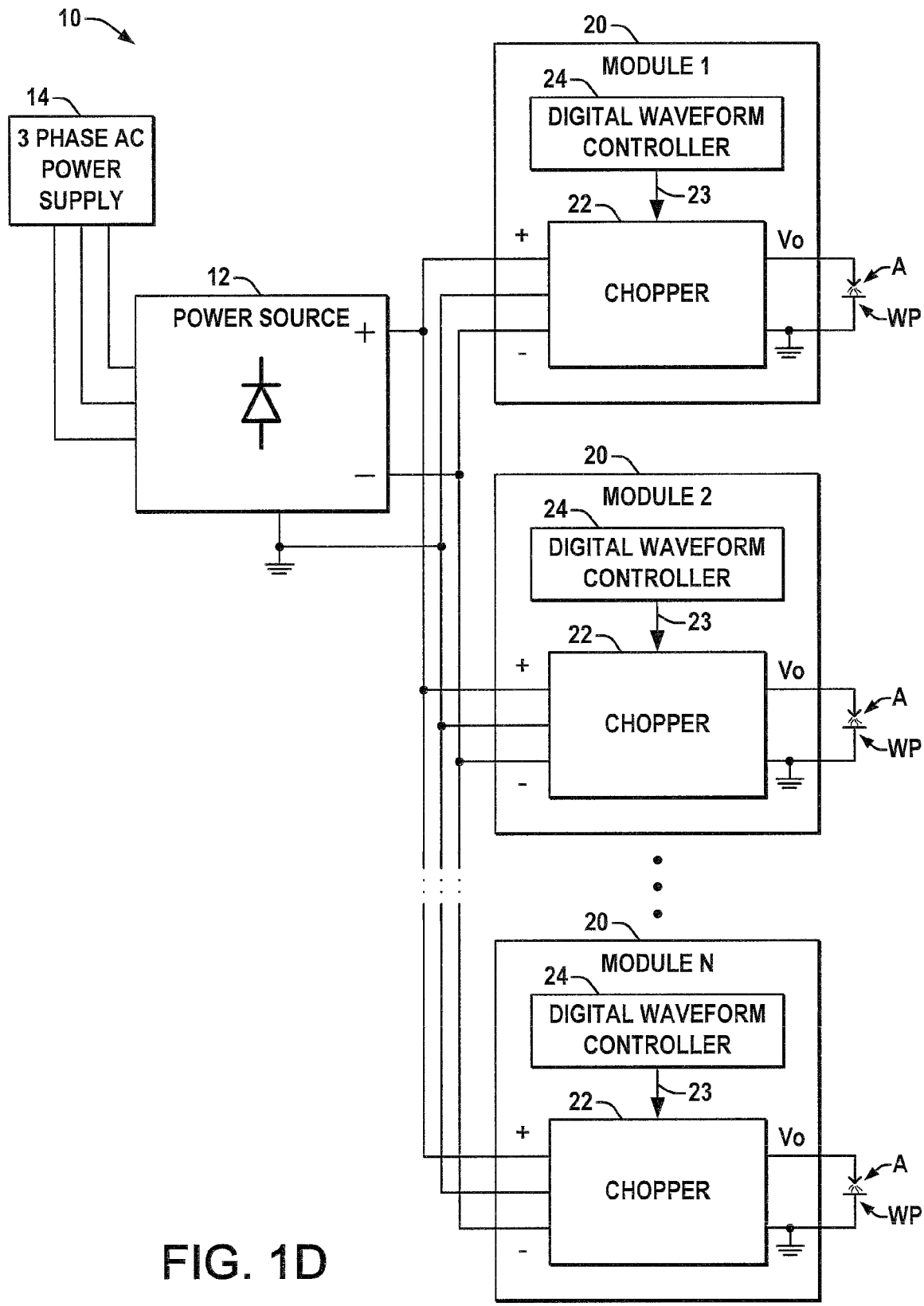
FIG. 1D is a simplified schematic diagram illustrating a welding system having a plurality of digitally controlled chopper modules and a single power source according to the invention.
Figure 10:
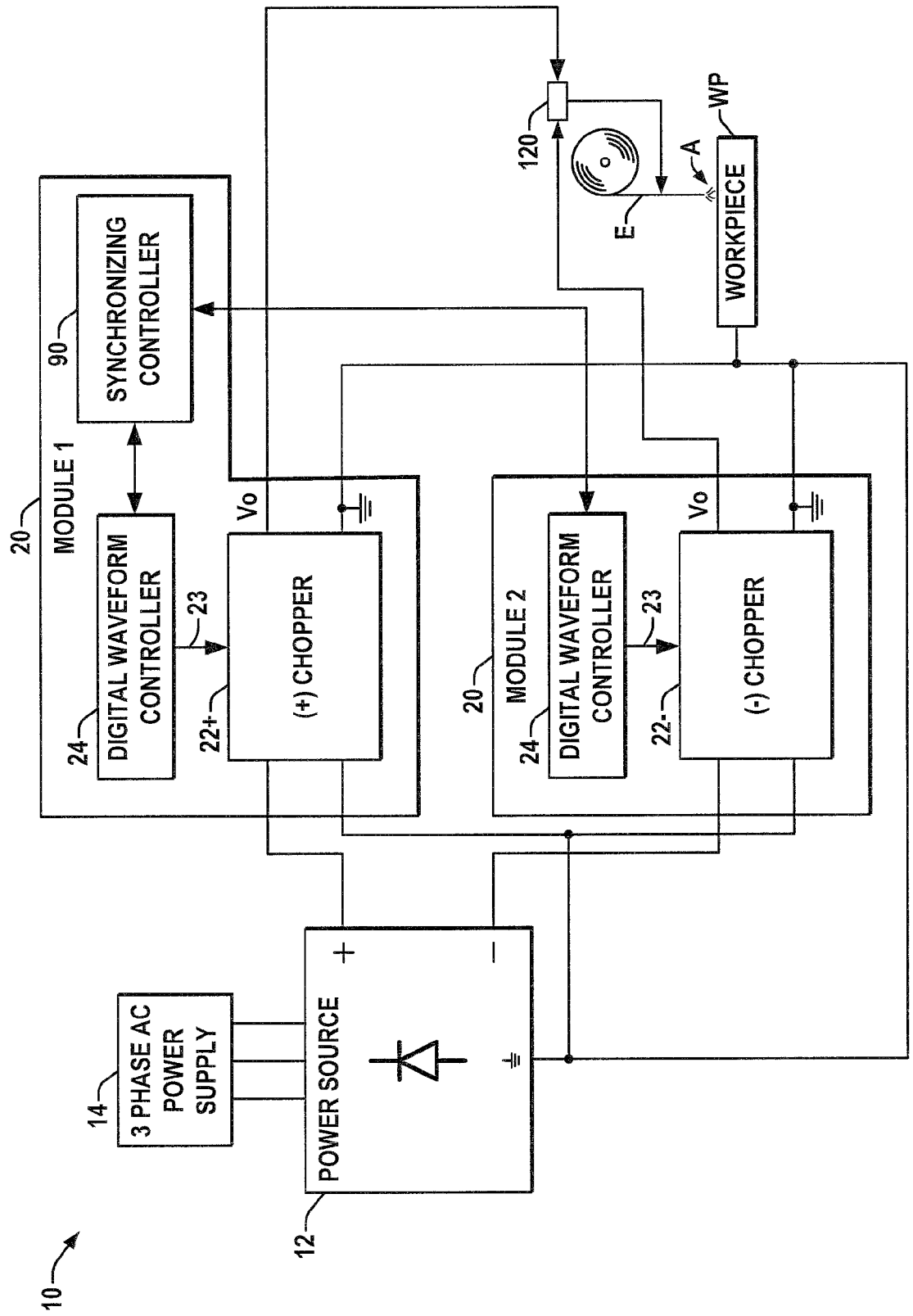
FIG. 10 is a schematic diagram illustrating another exemplary welding system having two chopper based welding modules and a single DC power source with positive and negative outputs, with a first welding module coupled as a positive chopper and a second module configured to operate as a negative chopper to implement a DC plus, DC minus, or variable polarity welding system adaptable to a variety of different welding processes in accordance with the invention.
Figure 11:
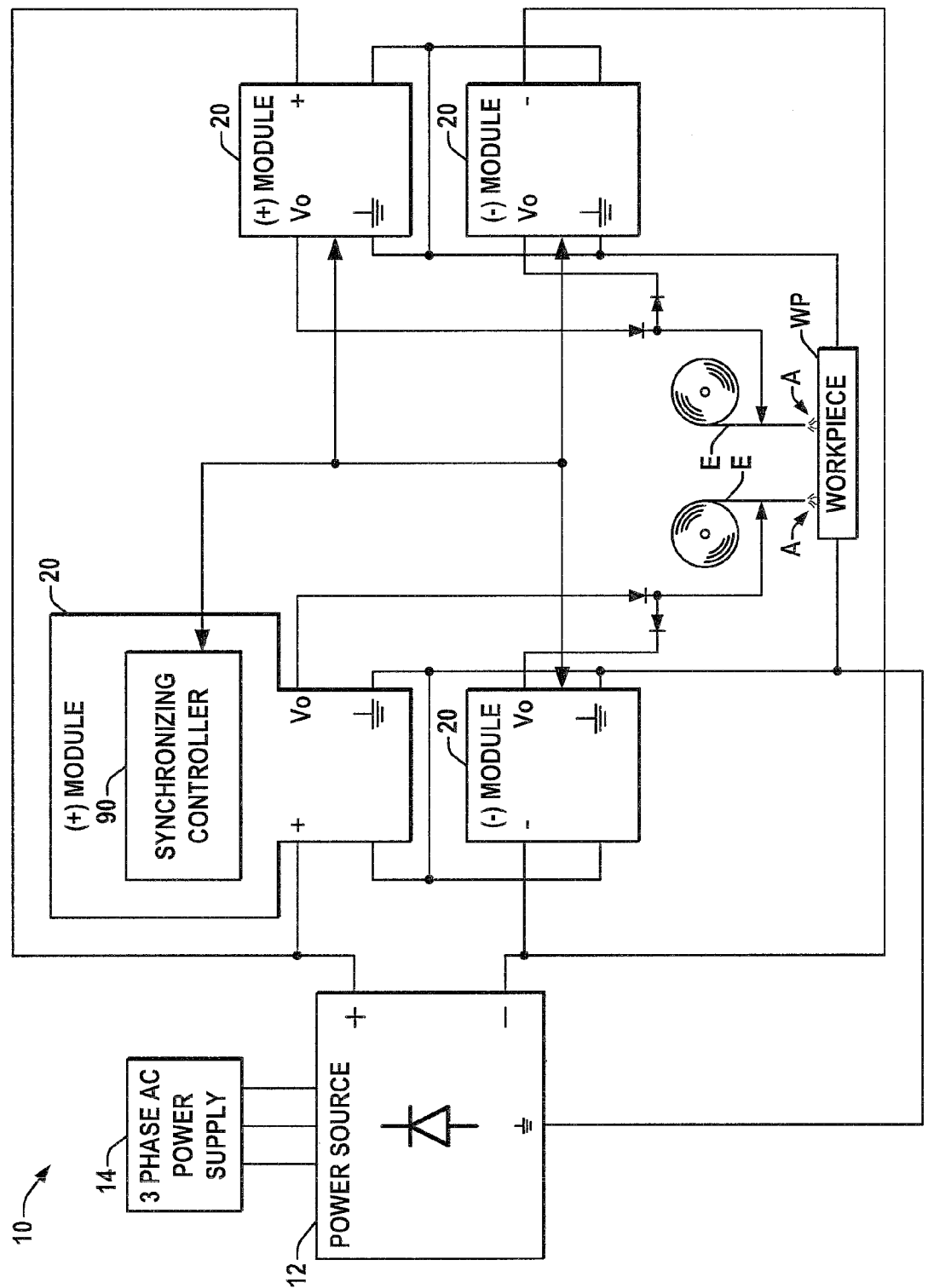
FIG. 11 is a schematic diagram illustrating another exemplary distributed welding system in accordance with the invention, having two pairs of positive and negative chopper modules with a single integrated synchronizing controller for performing a dual arc tandem welding process on a workpiece.
Figure 12:
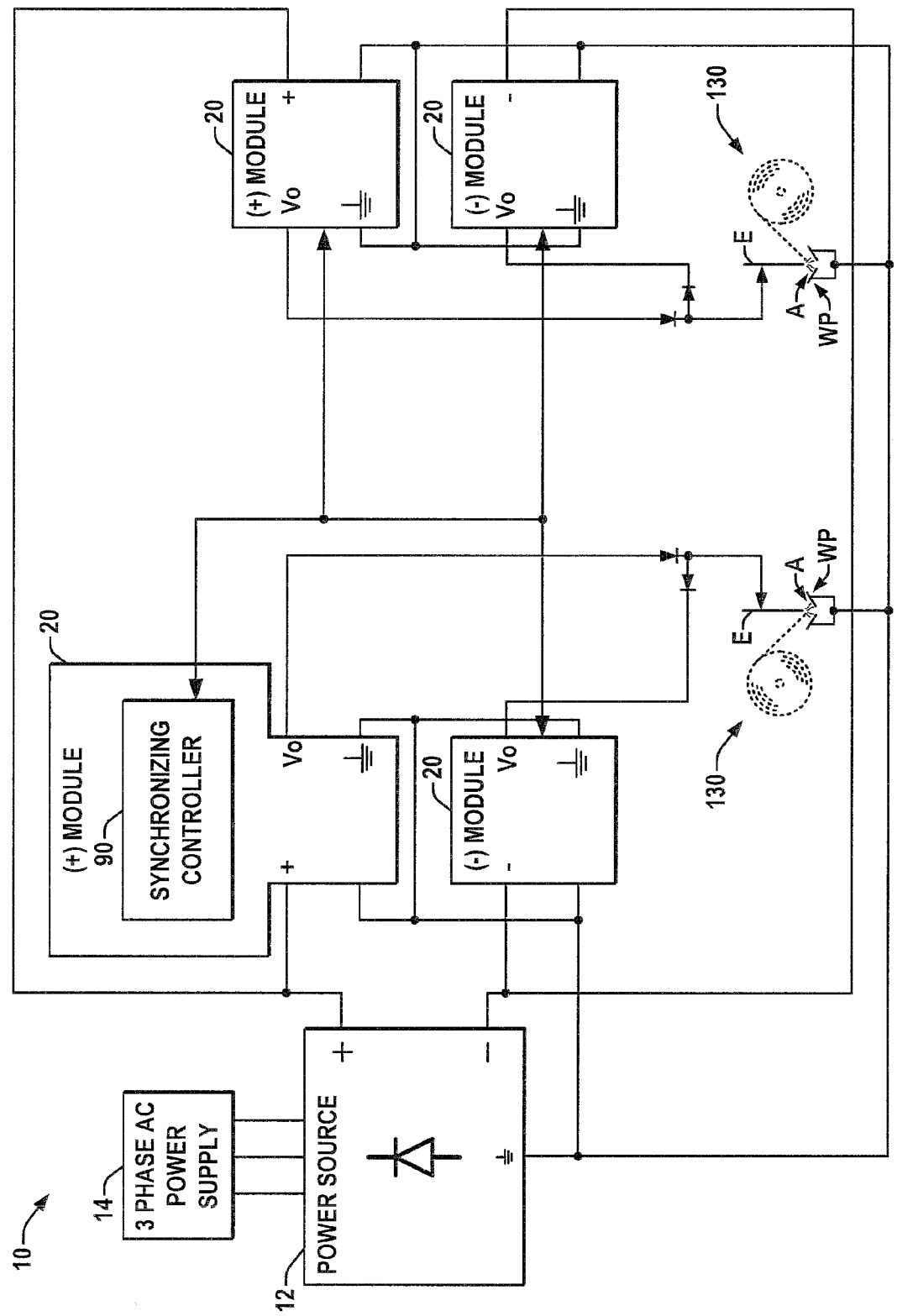
FIG. 12 is a schematic diagram illustrating another exemplary distributed welding system having two pairs of positive and negative chopper modules with a single integrated synchronizing controller for performing two TIG welding operations in accordance with the invention.

Referring also to FIG. 1D, the illustrated distributed welding systems 10 can include any integer number N welding modules 20, each having a chopper 22 and an associated digital waveform controller 24, wherein the modules may be individually used to provide a corresponding welding arc A to a workpiece in a multiple arc system (FIG. 1D), or two or more arcs may be created by corresponding modules 20 in a tandem welding process to weld a single workpiece (e.g., FIGS. 5-7 and 11 below), or more than one module 20 can be used in association with a single process, such as multiple polarity welding applications employing single polarity choppers 22 (e.g., FIGS. 10-12 infra). Due to the separate conversion of incoming AC power via power source 12, the associated transformers, rectifiers, etc., are not included within the individual chopper modules 20. Consequently, the bulk and weight associated with these devices are not present in modules 20, and modules 20 can therefore be integrated into relatively small, lightweight units, as shown in FIG. 1C, weighing less than about 100 pounds in the illustrated examples, whereby the modules 20 are easily transportable by a single person without requiring lift trucks, dollies, or other mechanized lifting apparatus (e.g., module 20 can be easily moved using handles 21a, 21b), while still being able to provide rated maximum welding output current levels of about 300 amps or more (e.g., about 350 amps in one embodiment). This distributed architecture using a single high capacity DC power source 12 and a number of digitally controlled chopper modules 20 facilitates ease of setup and installation of new or modified welding systems to accommodate changing operational needs at a given welding site (e.g., adding a new welding arc may simply require addition and programming of another module 20 and connection thereof to supply 12), as well as advantages with respect to inventory control, maintenance, substitution of common modules and usage throughout an entire manufacturing or construction facility, and cost savings by use of common component parts for the modules 20 themselves. Moreover, since modules 20 include digital waveform control technology, advanced welding operations may be undertaken in distributed welding systems, beyond the technical capabilities of prior distributed systems using welding modules having only basic analog or resistive tap type controls. Furthermore, the intelligent modules 20 facilitate creation of hybrid welding systems in which one module is programmed or otherwise configured for a first type of welding operation and other modules are setup for different weld processes. For instance, as illustrated and described further below with respect to FIGS. 2-2F, welding system 10 may be easily configured for pipe welding applications in which a first module 20 is used to create a root pass weld using a MIG welding process and another module 20 is setup for stick welding to form one or more filler pass welds to complete a weld joining the ends of two pipe sections. In this regard, the regulation of each arc A and process run by each module 20 can be coordinated or synchronized, or may be independent of all other arcs A and welding processes. In the example of FIG. 1D, for example, the first chopper module 20 can be running a conventional constant voltage gas metal arc welding (GMAW-CV) process at 150 amps and 18 volts while the second module 20 is performing a GMAW pulse welding operation at 250 amps and 24 volts.

Figure 2:
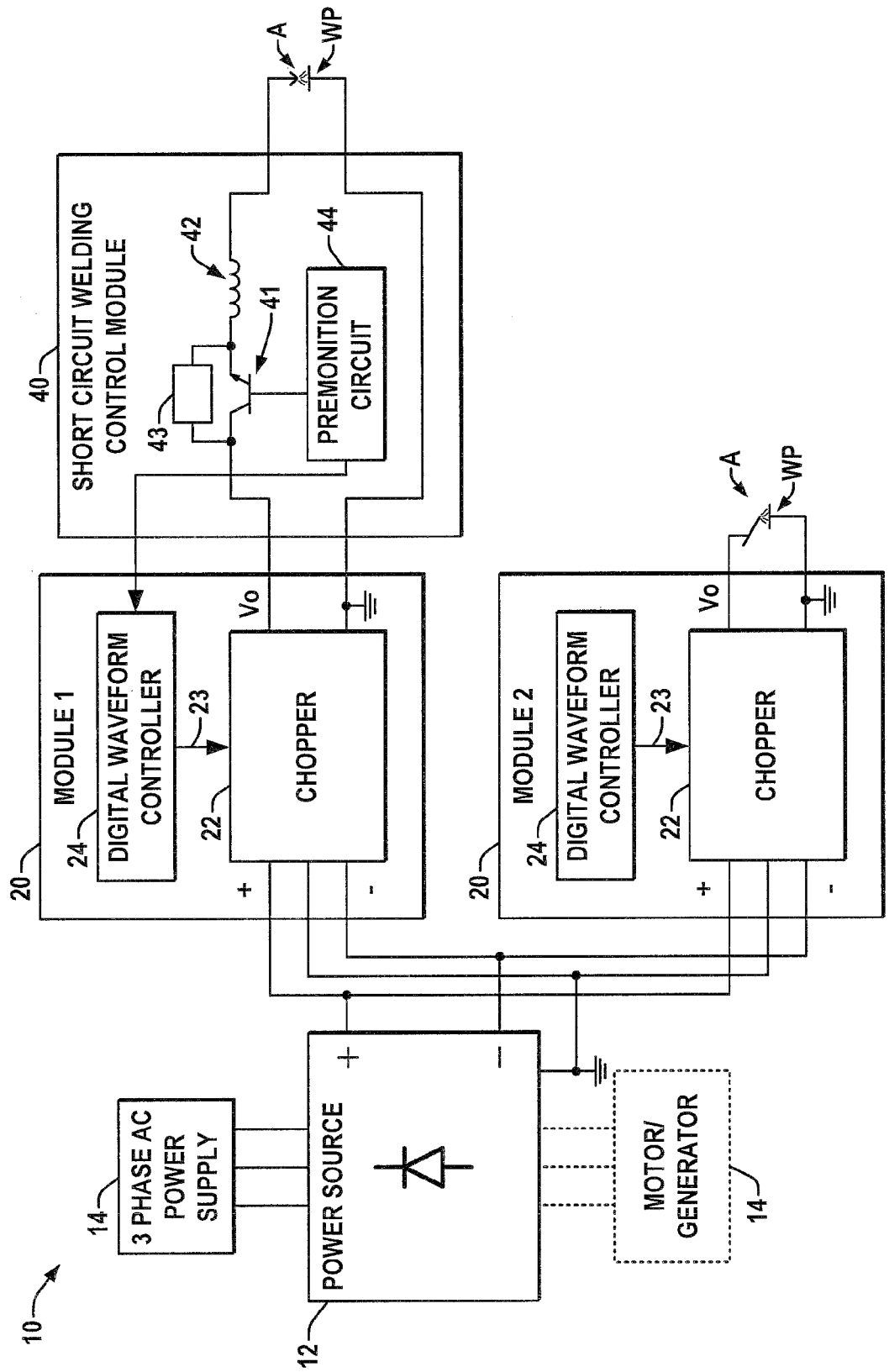
FIG. 2 is a schematic diagram illustrating another exemplary welding system with two chopper modules powered by a single DC supply, as well as a short circuit welding control module for selective control of one of the module output signals according to a sensed pending fuse breaking condition in a short circuit welding operation.
Figure 2A:
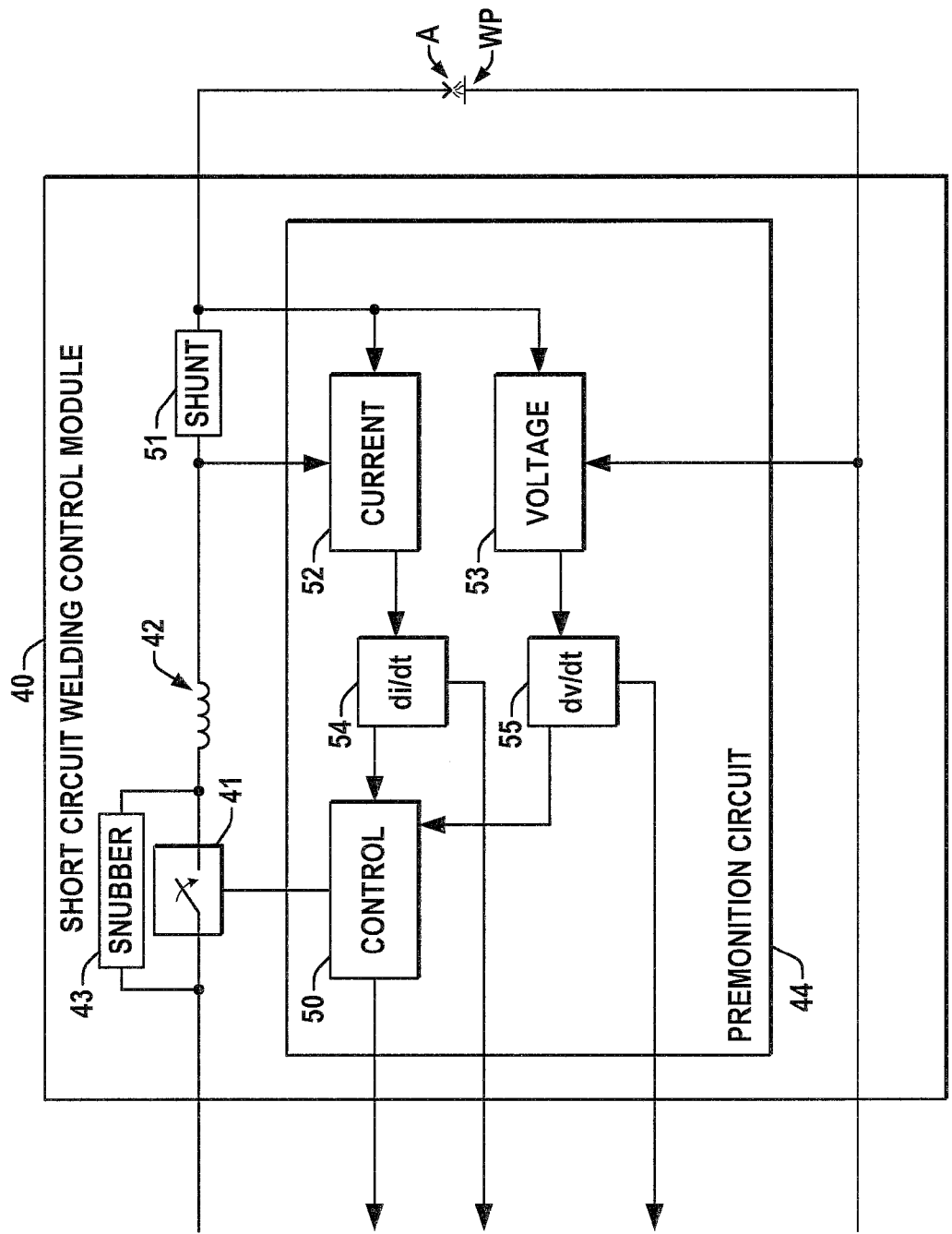
FIG. 2A is a schematic diagram illustrating further details of an exemplary short circuit welding control module in the system of FIG. 2.
Figure 2B:
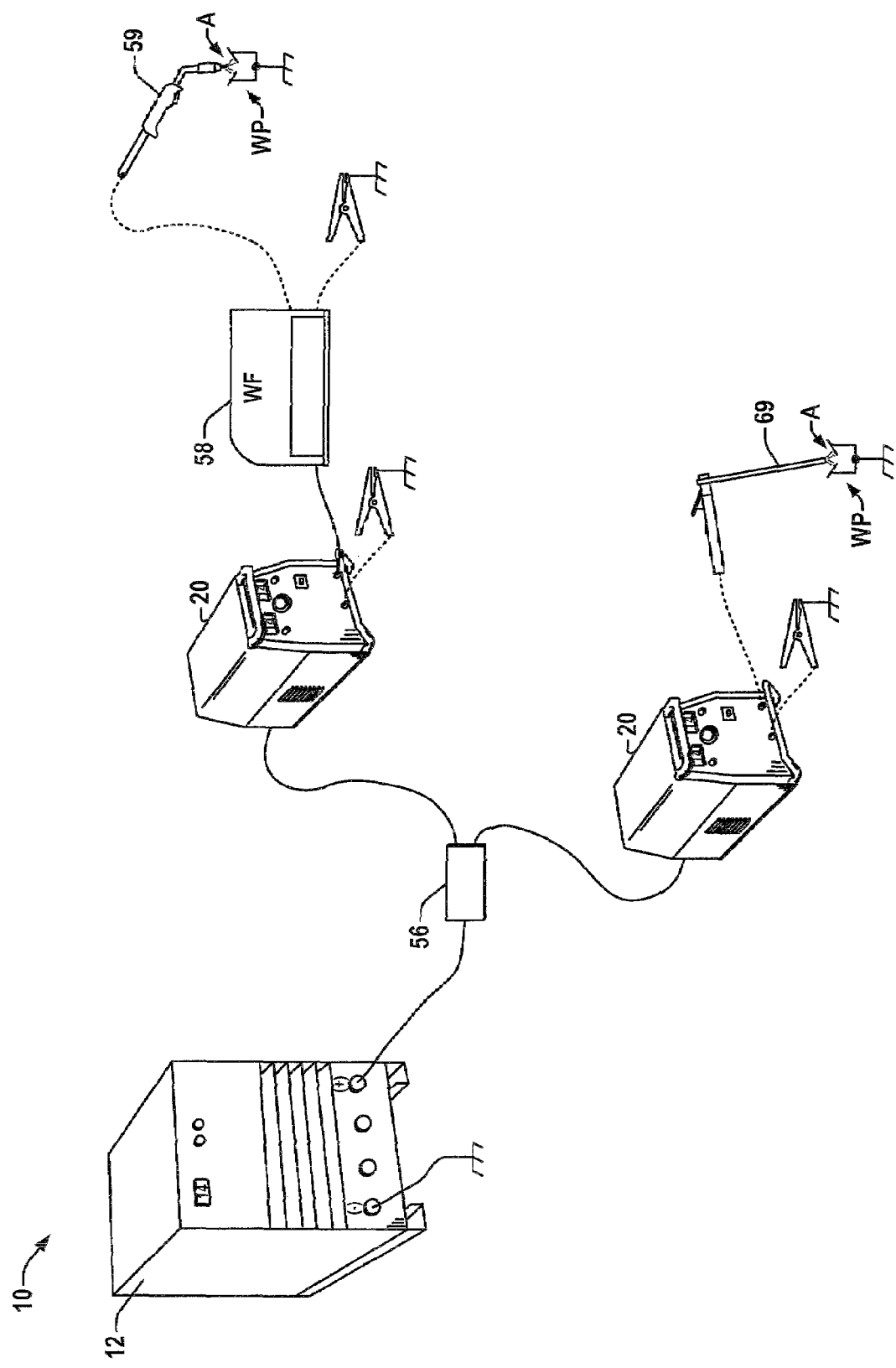
FIG. 2B is a system diagram illustrating an AC-DC power source providing an isolated DC signal with two digitally controlled chopper modules forming a distributed pipe welding system for performing a MIG root pass weld and subsequent stick welding filler passes.
Figure 2C:
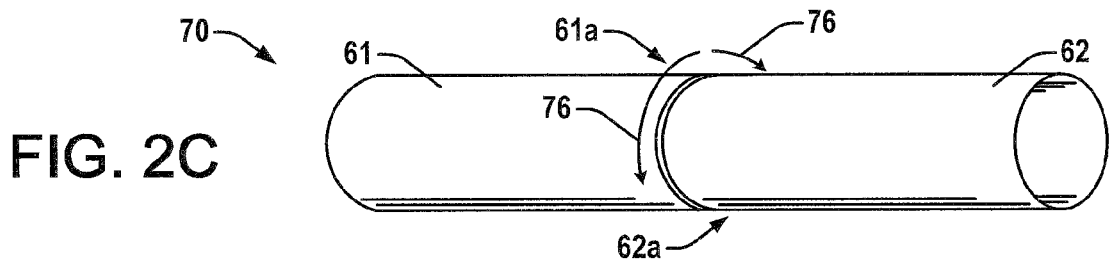
FIG. 2C is a partial perspective view illustrating fabrication of a pipeline by welding the ends of adjacent pipes sections.
Figure 2D:
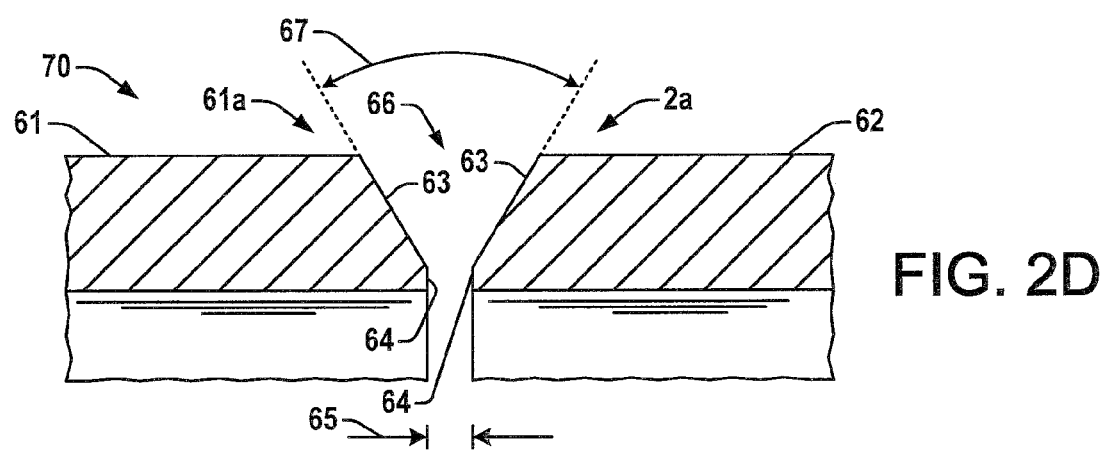
FIGS. 2D-2F are partial side elevation views in section illustrating joining of machined pipe section ends of FIG. 2C by performing a MIG root pass weld and subsequent stick welding filler passes using the system of FIGS. 2 and 2B to fill a groove between beveled surfaces of the pipe section ends.
Figure 2E:
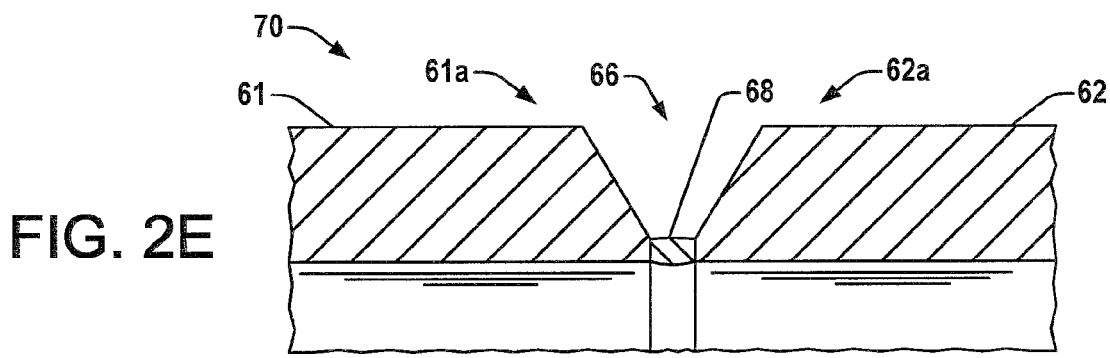
Figure 2F:
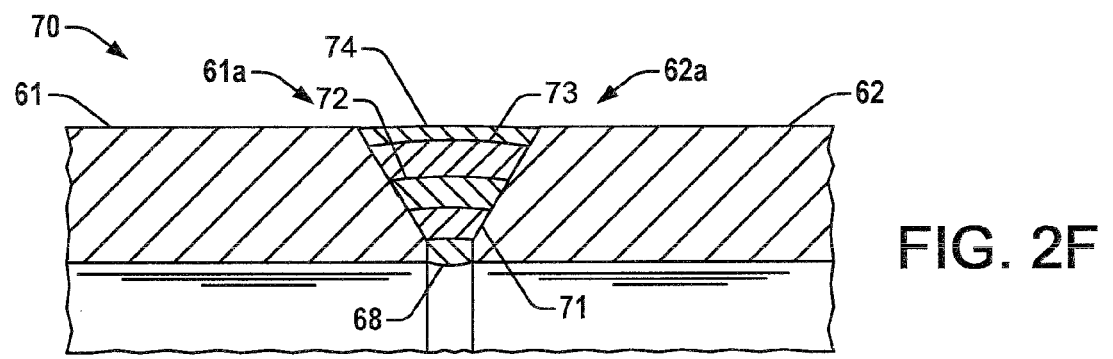

FIGS. 2-2F illustrate another exemplary embodiment of several aspects of the systems and modules, as well as several of the advantages thereof in a pipe welding application. This implementation of the welding system 10 includes a short circuit welding control module 40 coupled to receive the output welding signal waveform from a first welding chopper 22 of module 20. As best shown in FIGS. 2 and 2A, short circuit welding control module 40 includes a switch 41 in series with an inductor 42 between the first chopper 22 and an associated first welding process, with a snubber (e.g., resistor) 43 in parallel with switch 41, where a premonition circuit 44 controls operation of the switch 41 to selectively provide a low impedance current path (through switch 41) for chopper output current from chopper 22 to a weld process arc A with switch 41 in an "on" or conductive state, or alternatively a higher impedance path (through snubber 43) with switch 41 off (non-conductive state).

FIG. 2A provides further details of the exemplary short circuit control module 40, wherein premonition circuit 44 includes a switch control circuit 50 providing a gating control signal to place the switch 41 in one of the two states, and a feedback shunt 51 is provided in series with the inductor 42 and switch 41. The exemplary premonition circuit 44 includes current and voltage feedback circuits 52 and 53 which provide corresponding current and voltage feedback signals to di/dt and dv/dt circuits 54 and 56, respectively, for sensing an anticipated metal breaking fuse condition in a short circuit welding process. Control circuit 50 receives one or both outputs of circuits 54 and 55 indicating rates of change in welding current or voltage, respectively, and operates in response to one or both in order to set the state of the switch 41. Module 40 can be employed along with the module 20 to provide advanced short circuit arc welding control to reduce welding process spatter, wherein Parks U.S. Pat. No. 4,866, 247 and Stava U.S. Pat. No. 6,051,810 illustrate and describe detailed operation of suitable short circuit welding control modules 40 and exemplary short circuit welding processes, the entireties of which are hereby incorporated by reference as if fully set forth herein.

In operation of the exemplary module 40, an impending metal breaking fuse condition is anticipated while in a short circuit portion of each welding cycle, indicating that molten metal is about to separate from the welding electrode. In one implementation, a dv/dt signal from circuit 55 is compared with a threshold value in control circuit 50, and when the threshold is exceeded, control circuit 50 shuts off the switch 41 (placed in a non-conductive state) before a fuse is created during a short circuit condition. Operation of switch 41 in this manner changes the flow of welding current through inductor 42 from a high level current through switch 41 to low level current through snubber 43. The welding current is thus reduced to a low level to control the energy released by the fuse in order to reduce spatter. The premonition circuit 44 may also provide one or more status or control signals to the digital waveform controller 24 of the corresponding welding module 20, for instance, indicating the impending fuse condition, the beginning of a short circuit condition, etc. Moreover, short circuit welding control module 40 may be integrated in module 20, as shown in FIG. 2B, wherein the modules 20 are easily adapted to short circuit welding applications with circuit 44 selectively controlling switch 41, or with the switch set to the "on" state for other types of welding processes. In this regard, the cmodule 40 may be programmatically enabled or disabled as part of a waveform control program, and may be actuated selectively according to a selected desired waveform file 35 of the digital waveform controller 24 (e.g., FIG. 1B above).

FIG. 2B illustrates the system 10 configured for pipe welding applications with a short circuit welding control module 40 integrated in a first module 20 for advanced short circuit welding to create a first root bead to join two pipe sections, as well as a second module 20 configured for stick welding to create one or more subsequent filler passes to complete the pipe weld. The modules 20 are coupled to receive the DC signal output of power source 12 via a distribution box 56, and the first module 20 provides a welding signal output for the root pass using a wire feeder 58. Wire feeder 58 provides the welding signal and consumable welding wire or electrode to the root pass welding operation via a torch cable and a trigger operated welding torch 59, wherein various control and/or communications signals may be exchanged between wire feeder 59 and the first module 20 using suitable cabling or other communications means (not shown).

FIGS. 2C-2F show two pipe sections 61 and 62 being welded together for constructing a pipeline 70, wherein ends 61a and 62a of the sections 61 and 62 are welded together using conventional stick welding procedures. As best shown in FIG. 2D, the ends 61a, 62a are each machined to provide an outwardly facing external bevel 63 and a narrow flat land 64. The pipe sections 61 and 62 are then positioned in axial alignment with the ends 61a, 62a proximate one another using some form of clamping arrangement (not shown) in a closely spaced relationship to provide a narrow gap of length 65 between the two lands 64 with the beveled surfaces 63 forming a weld groove 66 having a groove angle 67, typically about 60 degrees. In practice, the ends 61a, 62a may initially be brought into contact with one another, and then the pipe sections 61 and 62 are carefully separated to provide the desired gap distance 65. As shown in FIG. 2E, the pipe ends 61a and 62a are then joined using the first module 20 and wire feeder 58 of the welding system 10 in FIG. 2B to form a root bead 68 to fill the gap between the land edges 64. In this regard, provision of the short circuit welding control module 40 advantageously facilitates the use of MIG short circuit welding techniques for optimizing the quality and integrity of the root bead 68. After the root pass, the second module 20 is employed to perform one or more stick weld filler passes using a stick electrode 69 (FIG. 2B) connected to the second welding module 20 to form a welding arc between the electrode 69 and the pipe material, FIG. 2F illustrates a first filler bead or weld layer 71 created over the root bead 68, after which second, third, and fourth filler welds 72, 73, and 74, respectively, are created in similar fashion using stick welding to fill the groove 66 so that the weld metal is at least flush with the outer surfaces of the pipe sections 61 and 62. As shown in FIG. 2C, the filler welds may be performed in two operations, each beginning at the top of the joined pipe sections 61,62 and proceeding down and around in the directions shown by arrows 76, wherein provision of further modules 20 may facilitate concurrent welding of filler passes allowing two or more stick welding operations to proceed simultaneously.

Figure 3:
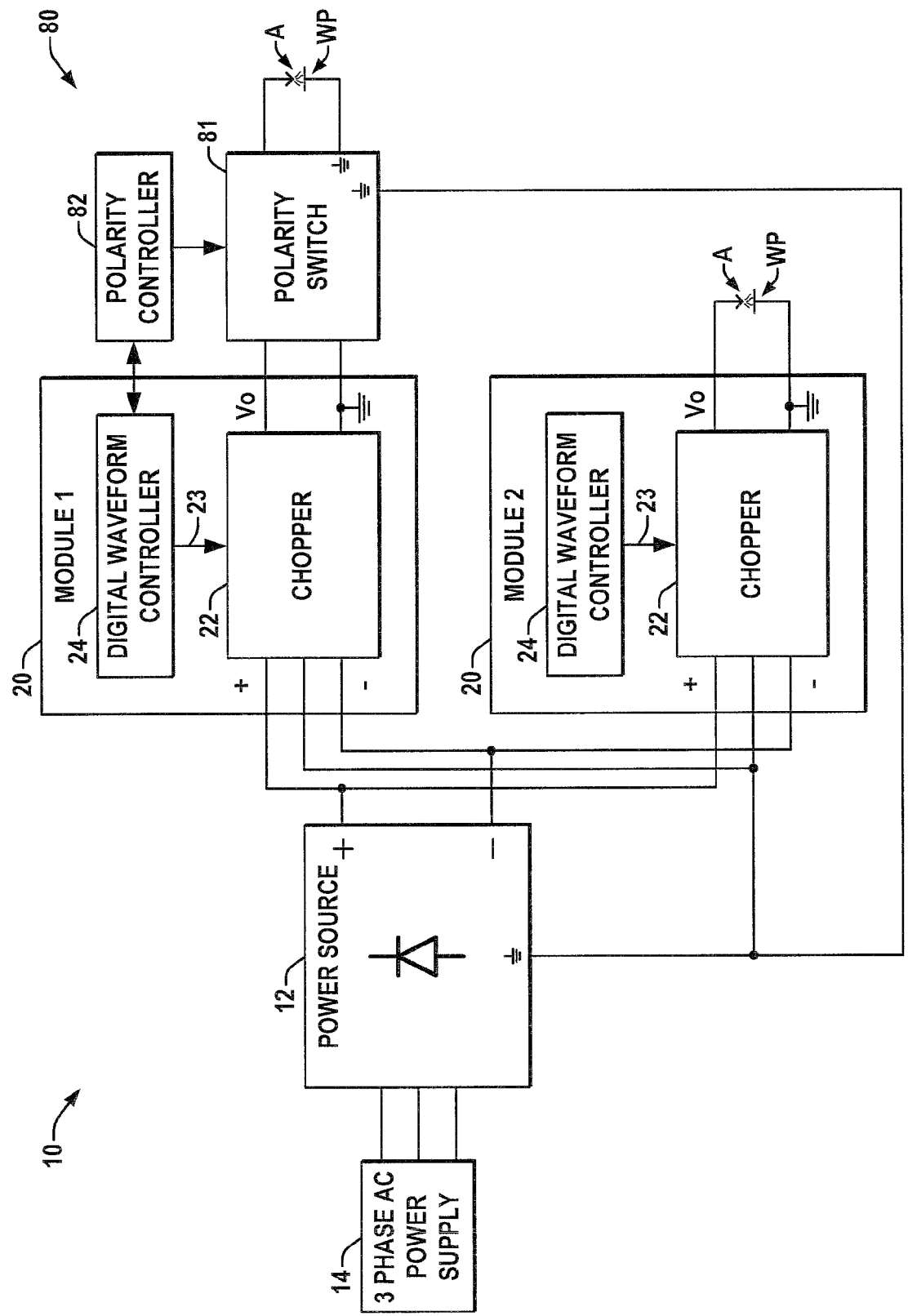
FIG. 3 is a schematic diagram illustrating another exemplary distributed welding system in accordance with the invention, having a polarity switching system coupling the output of a first chopper to a welding process.
Figure 3A:
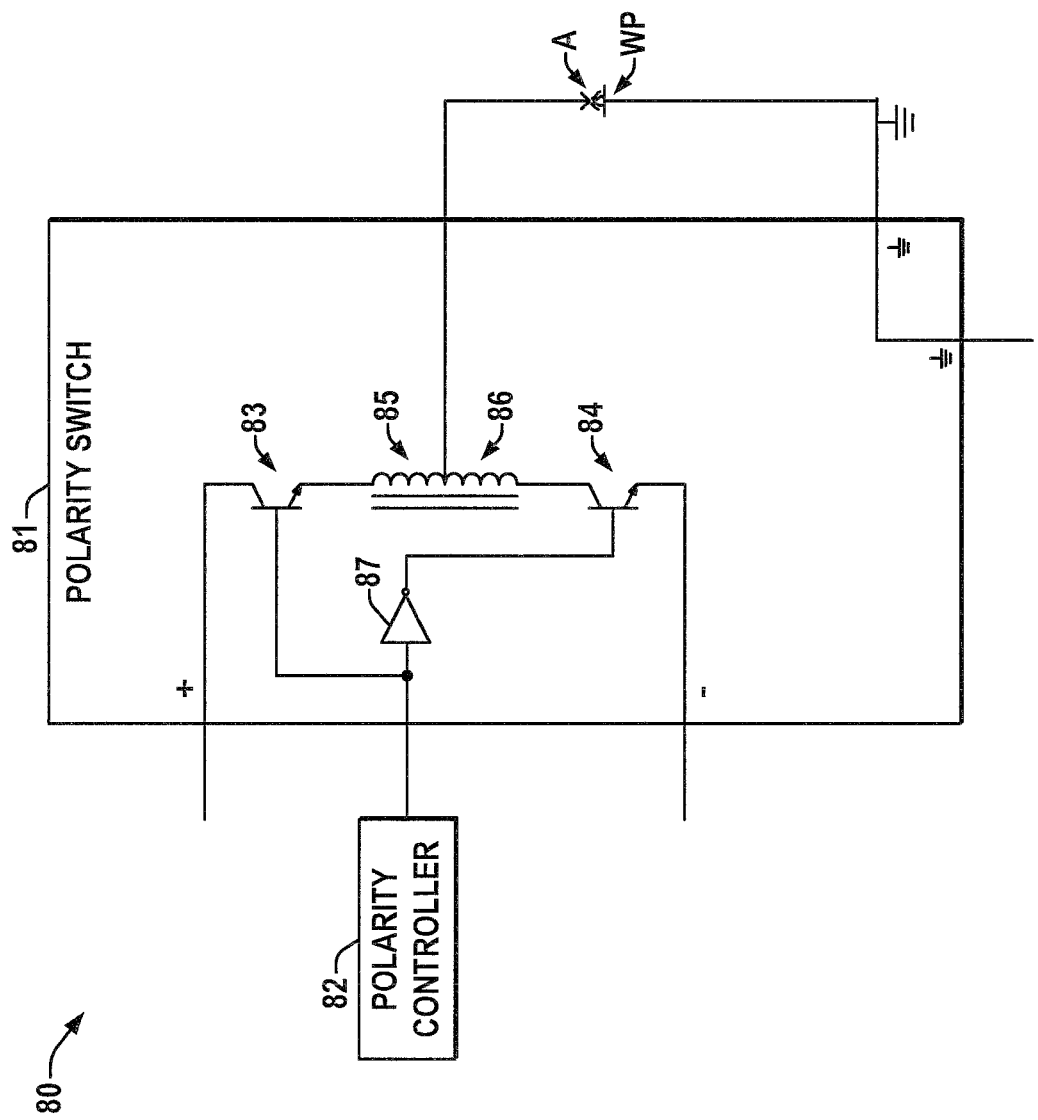
FIG. 3A is a schematic diagram illustrating further details of the exemplary polarity switching system of FIG. 3.

Referring now to FIGS. 3 and 3A, in accordance with another aspect of the invention, the welding system 10 may further include a polarity switching system 80 with a polarity switch 81 and a polarity controller 82, where the system 80 receives the electrical welding signal waveform from the first welding module 20 and provides the signal with either a first or second electrical polarity to the first welding process. This may be advantageous, for example, to run variable polarity gas tungsten arc welding (GTAW) operations using the system 10. Power source 12 in the illustrated embodiment of FIG. 3 includes a center or offset tap or ground terminal coupled to the polarity switch and/or to the first workpiece WP, as well as positive and negative DC output terminals coupled to the modules 20, which in turn can include AC or single ended choppers 22. FIG. 3A illustrates one suitable polarity switching system 80, wherein the polarity switch 81 receives a switching control signal from polarity controller 82 to selectively provide positive or negative welding current to the welding process arc A. A first switch 83 is coupled between the positive output from chopper module 20 (FIG. 3) and a first portion 85 of a center tapped choke, with switch 83 being operated according to the control signal from controller 82. A second switch 84 connects the negative module output to a second portion 86 of the tapped choke, and second switch 84 is operated in opposite fashion according to an inverted control signal via an inverter 87. When the controller output is in a first logical state, switch 83 is on and switch 84 is off, whereby positive welding waveform signal current is provided to the welding operation. Conversely, in the second state of the signal from polarity controller 82, switch 84 is on and switch 83 is off, by which negative welding waveform current is provide to the process. As with the above described short circuit welding module 40 (FIGS. 2 and 2A above), the polarity switching system 80 may be integrated into welding chopper module 20, whereby the module is further adaptable to a variety of welding applications without external modification.

Figure 4:
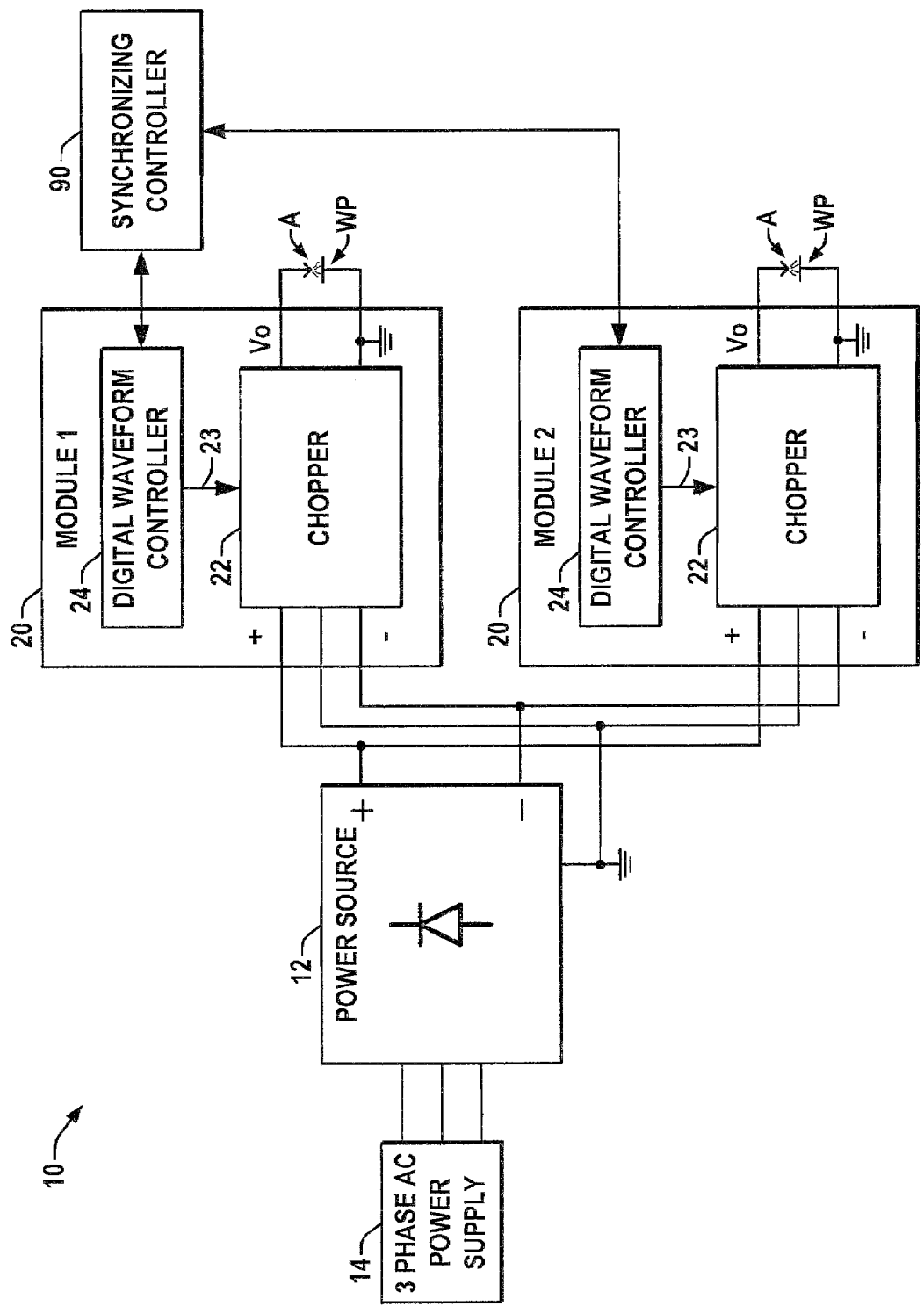
FIG. 4 is a schematic diagram illustrating another multiple arc welding system having a synchronizing controller coupled to synchronize the digital waveform controllers of first and second welding modules.
Figure 4A:
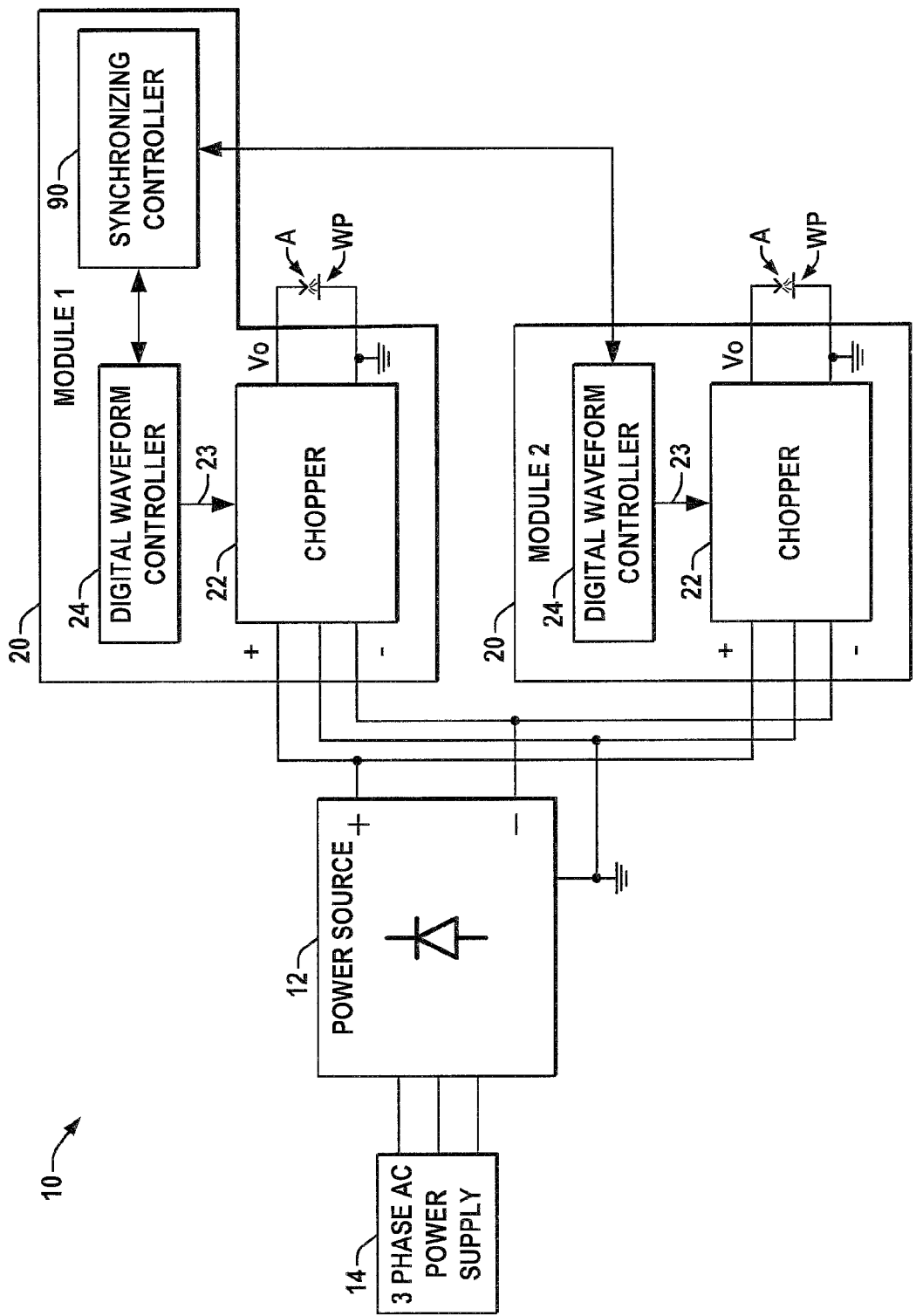
FIG. 4A is a schematic diagram illustrating a welding system with a synchronizing controller integrated into a first chopper module.

FIGS. 4 and 4A illustrate another aspect, wherein the distributed welding system 10 includes a synchronizing controller 90 for synchronizing the first and second digital waveform controllers 24 of modules 20. This may be beneficial in automated systems where multiple arcs A can interfere with each other, and/or in variable polarity applications where coordination between 2 or more chopper modules 20 is needed in order to alternate the polarity at a specified rate. Synchronizing controller 90 sends and receives signals and/or messages to and from the digital controllers 24 so as to coordinate the operations of the modules 20, thereby making the welding system 10 easily adaptable to situations in which coordination of two welding processes or welding arcs is desired, and/or applications having two modules 20 providing waveforms to a single welding electrode, or other circumstances in which it is desirable or necessary to temporally coordinate the operation of two welding chopper modules 20. In one implementation, the synchronizing controller provides one or more periodic "heartbeat" signal or equivalent time synchronization signals or messages to one, some, or all of the modules 20 in the distributed system 10. Each digital waveform controller 24 may employ such signaling or messages to generate a waveform coordinated with other waveforms produced by the other digital controllers 24 in the system 10. As shown in FIG. 4A, moreover, a synchronizing controller 90 may be integrated into one or all of the welding modules, wherein synchronization or other supervisory control can be implemented by a selected one of the synchronizing controllers 90 in a programmatic fashion. For instance, the modules 20 may each include an integrated synchronization controller 90, wherein one of the modules 20 of a given welding system 10 is configured as a master that provides synchronization control, monitoring, data acquisition, or other functions for the entire system 1. In one possible embodiment, the synchronizing control functions can be provided as a control program or routine executed by the digital waveform control microprocessor 30 (FIG. 1B).

Figure 5:
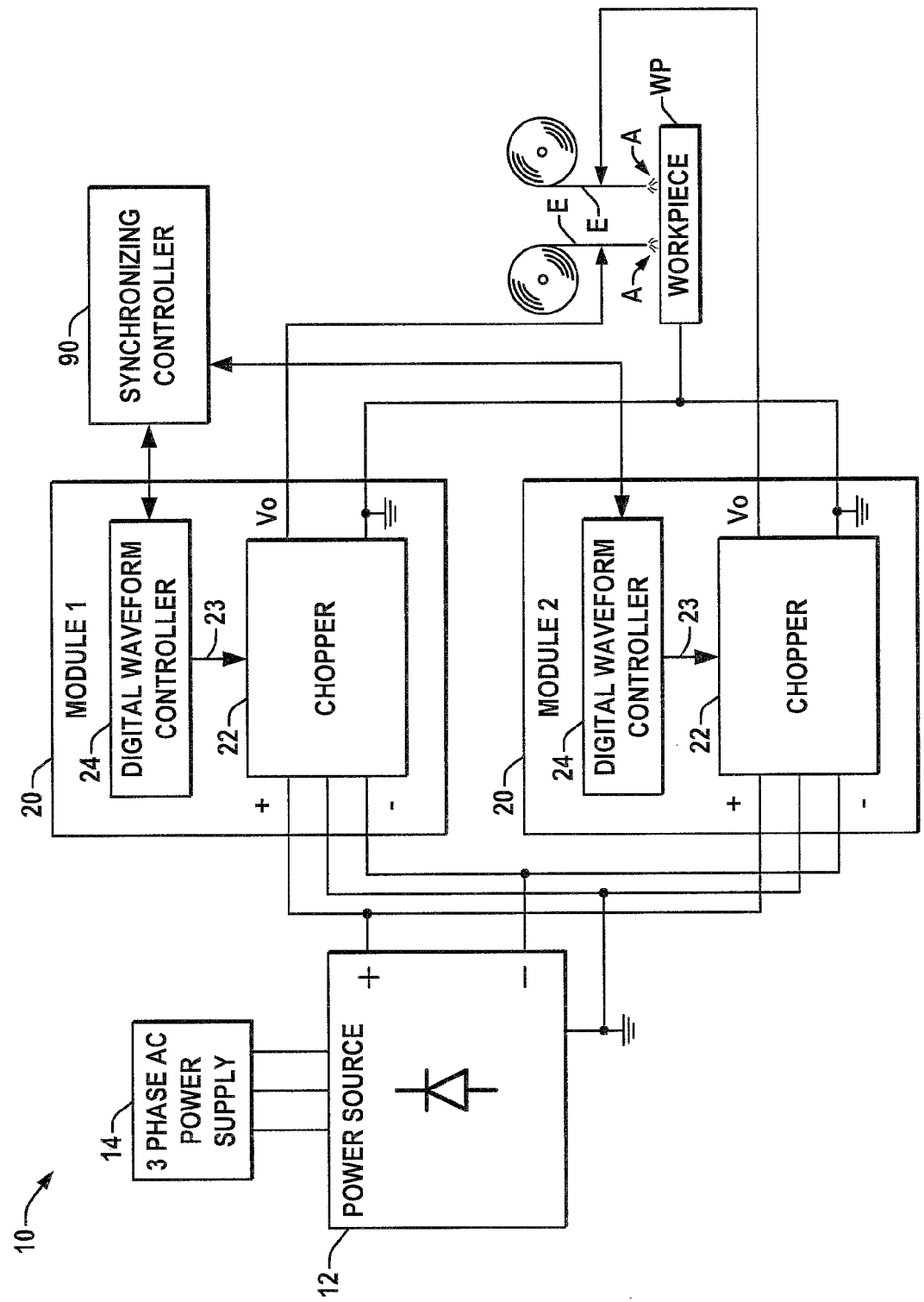
FIG. 5 is a schematic diagram illustrating an embodiment of the welding system of FIG. 4 configured to implement a tandem welding operation using welding arcs provided by the first and second welding modules.

Turning now to FIG. 5, one situation where synchronization is beneficial is in tandem welding processes using a dual wire gas metal arc welding (GMAW) approach, in which the electrodes E are close enough to one another to deposit molten metal into a single weld pool. The close electrode spacing, however, may cause the arcs A to interact with each other, wherein alternately pulsing the arc can reduce this phenomenon, as shown in Stava U.S. Pat. No. 6,207,929, incorporated herein by reference. The present invention facilitates the ability to run both arcs from a single power source in a distributed system 10, while synchronizing the welding output signals to reduce such arc interactions. Moreover, because the peak currents may thus be applied to the arcs A in alternating fashion, the modules 20 do not draw peak current from power source 12 at the same time, whereby the size of the required power source 12 can be less than two independent welder supplies. FIG. 5 illustrates an embodiment of the welding system 10 of FIGS. 4 and 4A configured to implement a tandem welding operation using welding arcs A provided by the first and second welding chopper modules 20. In the tandem setup of FIG. 5, two electrodes E are directed toward a weld joint of a single workpiece, and separate first and second welding arcs A are provided through welding waveform signals from the chopper modules 20 to implement a dual wire tandem MIG process. Stava U.S. Pat. No. 6,207,929 illustrates and describes various aspects of tandem welding operations and systems therefor. Tandem welding is typically used to maximize weld material deposition rates, where the welding operations are performed concurrently as the electrodes E are translated along a path to fill a weld joint, with one electrode being a lead electrode E and the other being a trailing electrode E.

In one situation, the welding arcs A are held stationary while a travel carriage or other mechanized system moves the workpiece WP relative to the arcs A. Alternatively, the electrodes E and associated welding equipment are moved relative to the workpiece WP. In either approach, it is often desirable to minimize adverse electromagnetic interaction between the two arcs A to ensure the integrity of the resulting weld joint, particularly where the two arcs A are relatively closely spaced. In this regard, while the system 10 is shown as provided two arcs A and associated welding electrodes E in welding the workpiece WP, any number of such arcs may be used in a tandem welding situation, wherein the advantages of the present invention facilitate adaptation of further modules 20 for such multiple arc applications. Furthermore, the digital waveform controls 24 provided for each chopper module allow the adaptation and synchronized control of the individual arcs A in a coordinated fashion to mitigate arc interaction. For instance, as shown in Stava U.S. Pat. No. 6,207, 929, the switching frequencies used in creating the welding signals used in creating the individual arcs A may be varied, wherein the waveform control technology of the chopper modules 20 may be used to operate the modules 20 at different switching frequencies, wherein synchronizing controller 90 is operable to adjust the frequencies, phasing, or other relative characteristics of the switching signals 23 applied by the digital waveform controllers 24 of modules 20 in a synchronized or coordinated fashion to minimize or reduce adverse arc interaction. In other situations, synchronizing controller 90 may synchronize the modules 20 such that the peak currents are applied alternately to the two arcs A so as to reduce or minimize unwanted arc interaction in the system 10. Furthermore, as illustrated and described below with respect to FIG. 10A, a pair of choppers 22, digital controllers, 24, and a synchronizing controller 90 may be integrated into a single machine or tandem welding module 20a easily adaptable to such tandem welding or AC welding applications.

Figure 6:
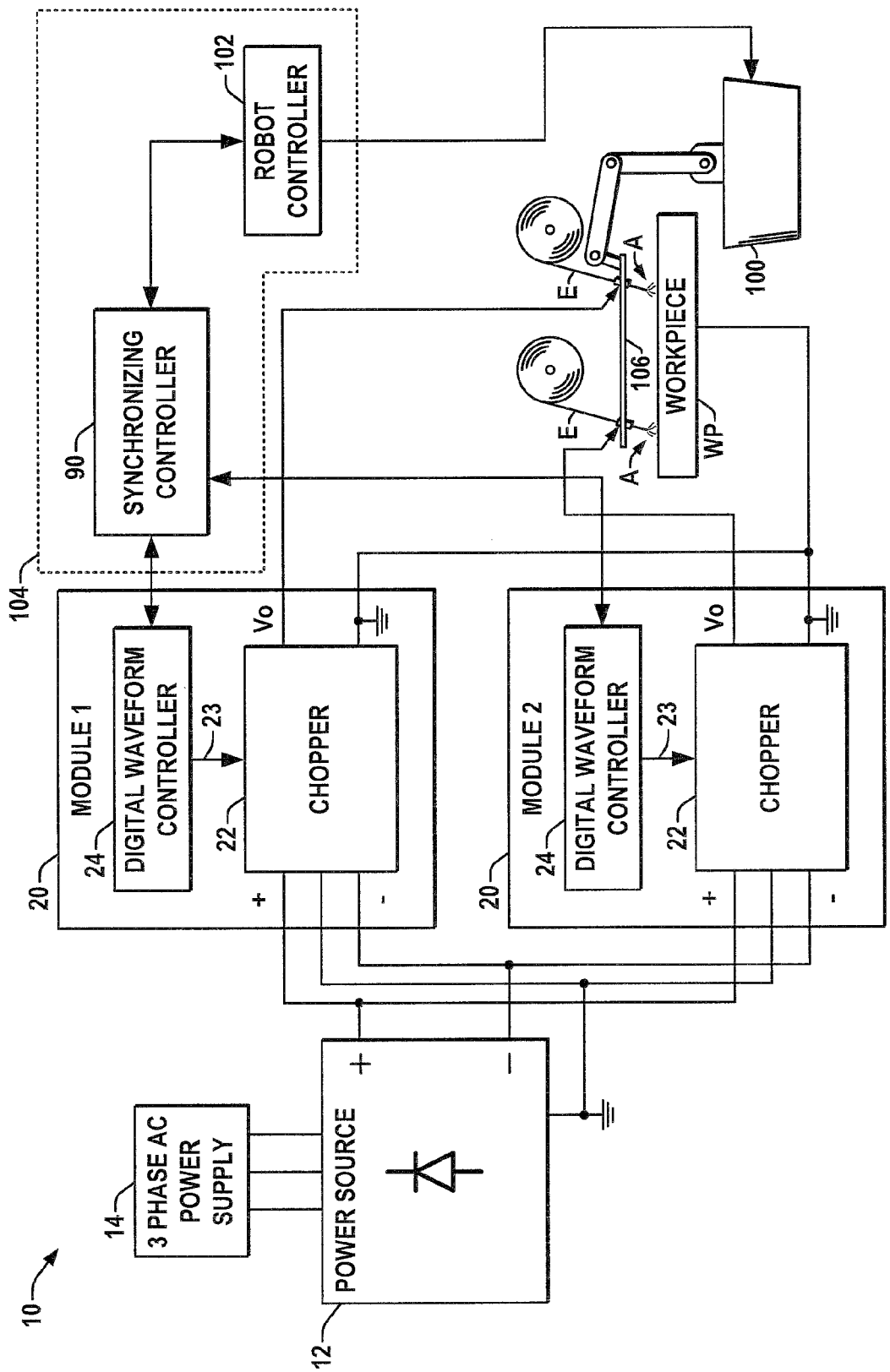
FIG. 6 is a schematic diagram illustrating another embodiment of the system of FIG. 4 performing a tandem welding operation with multiple arcs using a robot and robot controller.
Figure 7:
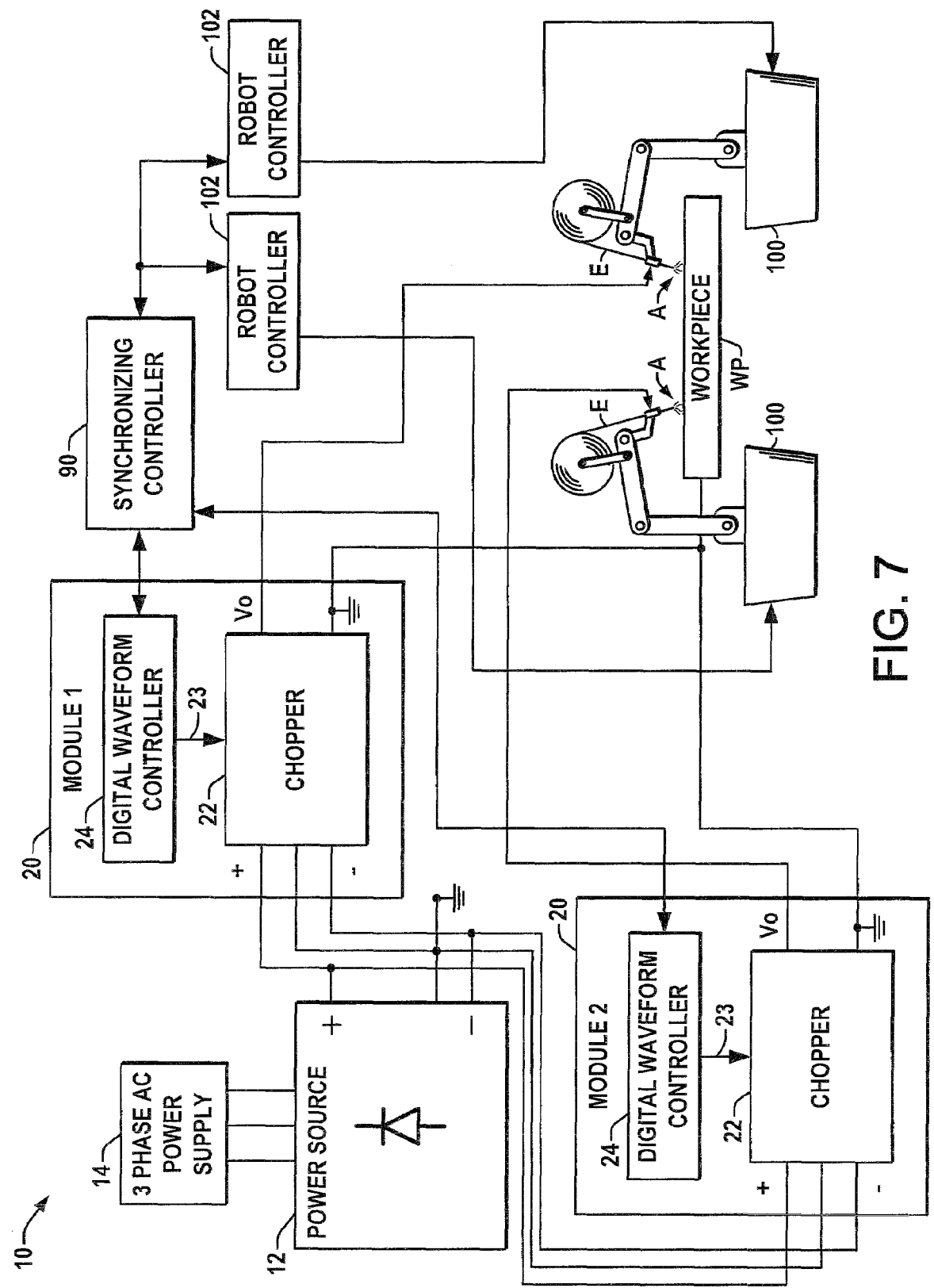
FIG. 7 is a schematic diagram illustrating another embodiment of the system of FIG. 4 performing multiple arc welding operations on a single workpiece using two robots and associated controllers.

Referring now to FIGS. 6 and 7, FIG. 6 shows another embodiment of the system 10 employed in a tandem MIG welding situation with multiple arcs A using a robot 100 and a robot controller 102 that can communicate directly with the welding system components via the synchronizing controller 90, for example, using the Arc Link protocol offered by the Lincoln Electric Company or other suitable digital communications link or signaling means. Robot controller 102 operates the robot 100 and various mechanical actuators thereof in order to translate a tandem welding fixture 106 and the welding equipment thereof relative to a workpiece WP in a controlled fashion. In one embodiment, synchronizing controller 90 and robot controller 102 may be integrated in a single control device 104 which provides for synchronization of the chopper modules 20 and the digital waveform controllers 24 thereof, as well as for automated control of robot 100.

Another example of synchronized control in a distributed welding system 10 is shown in FIG. 7, wherein two separate robots 100 are provided with corresponding robot controllers 102, where synchronizing controller 90 is operatively coupled with the robot controllers 102 and digital waveform controllers 24 of the chopper modules 20. In this configuration, synchronizing controller 90 can provide for coordinated operation of modules 20 to avoid or mitigate arc interaction and to operate the robots in conjunction with the individual welding operations. As discussed above, the programmability and flexibility of the digital waveform controller 24 of each chopper module 20 facilitates system welding operations covering a range of typical applications, such as DC/Pulse, standard Pulse/Pulse, etc., wherein the provision of the synchronizing controller 90 allows a fully synchronized Pulse/Pulse process to be performed with alternating current peaks of the pulse waveforms to minimize arc interference. Moreover, in applications where the direction of travel of a travel carriage or other robotic or mechanized translation devices is reversed, the synchronizing controller 90 and/or the individual digital waveform controllers 24 can be signaled or otherwise informed through various communications or signaling interconnections, and thereupon modify or adjust the procedure and/or process of each module 20 accordingly. For instance, in a tandem welding operation, direction reversal and corresponding waveform adjustments by the affected digital controllers 24 can allow the trail electrode E to operate as a lead electrode E and vice versa.

Figure 8:
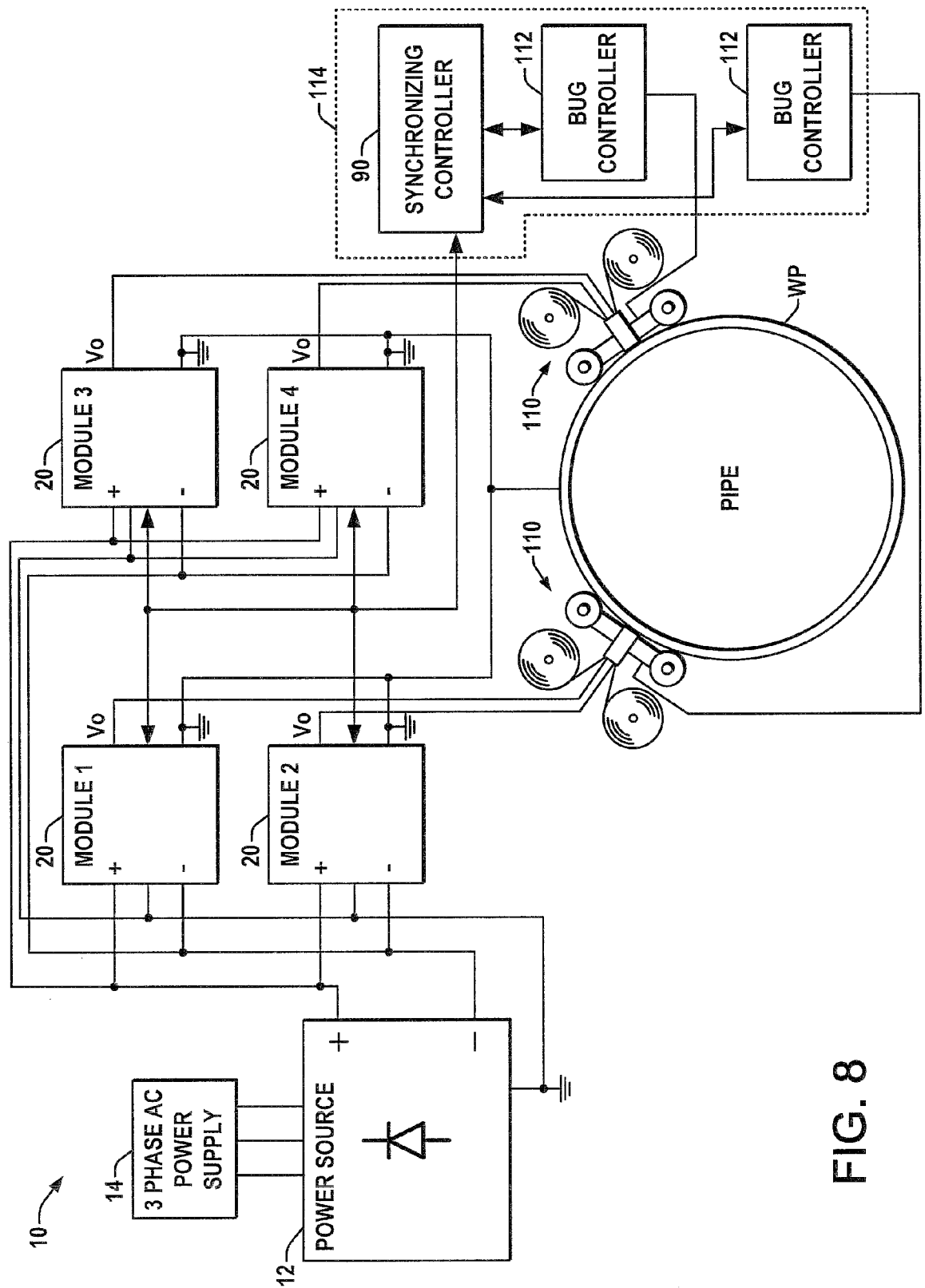
FIG. 8 is a schematic diagram illustrating another exemplary multiple arc welding system having four digitally controlled chopper modules in accordance with the invention, configured in a pipe welding operation with two dual arc welding bugs and associated controllers.
Figure 9:
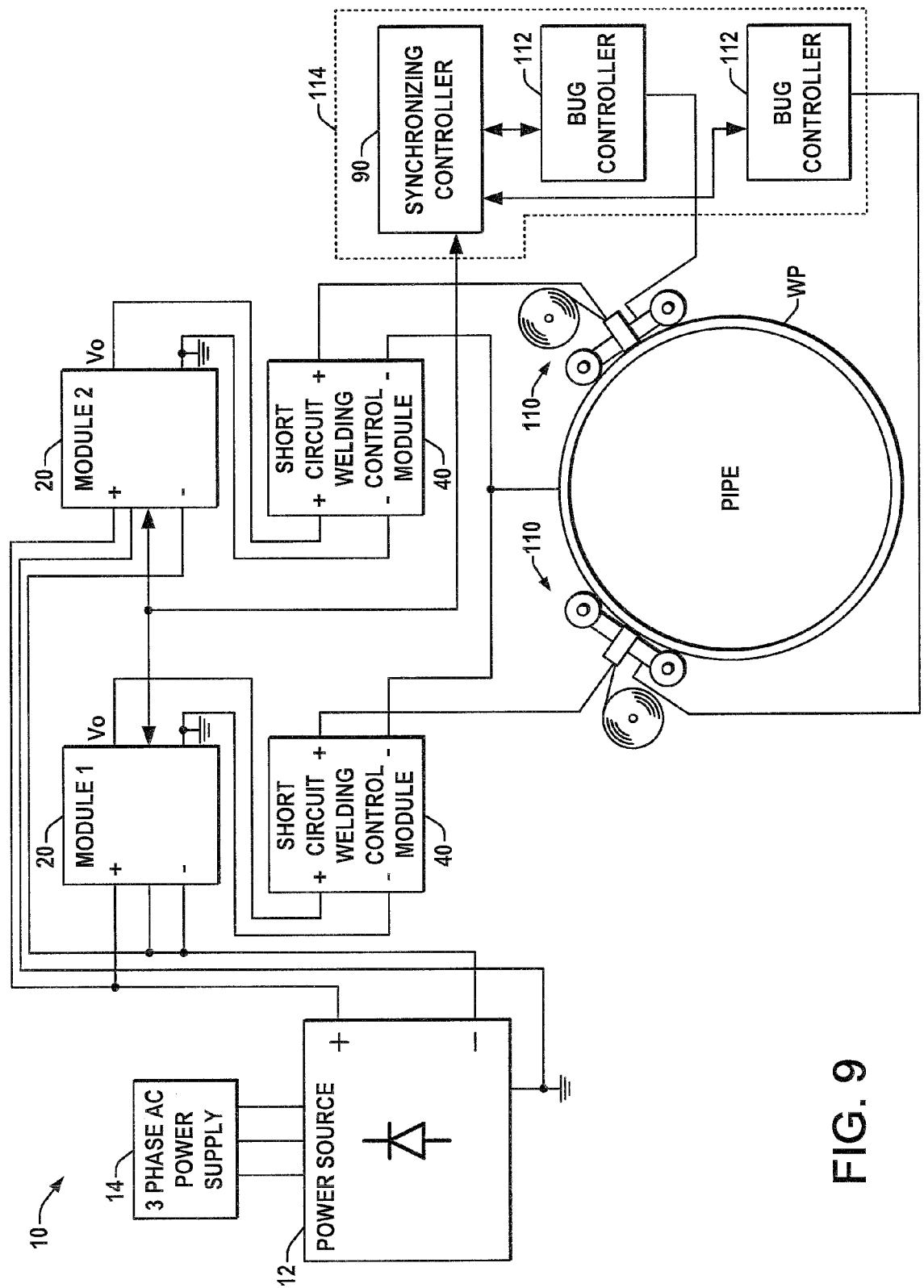
FIG. 9 is a schematic diagram illustrating another exemplary welding system with short circuit welding control modules coupled with each of two digitally controlled welding modules to perform a multiple arc pipe welding operation using two welding bugs and associated controllers.

Referring to FIGS. 8 and 9, FIG. 8 depicts another embodiment of the distributed multiple arc welding system 10 configured in a pipe welding operation with two dual arc welding travel carriages or bugs 110 and associated bug controllers 112, including four digitally controlled chopper modules 20 in accordance with the invention. As with the above robot based system embodiments, the bug controllers 112 are operatively coupled with the synchronizing controller 90, and may be integrated with controller 90 into a unified control device 114, or may be separate control components, or the synchronizing controller 90 may be integrated in one of the chopper modules 20 as illustrated and described above. Each welding bug 110 includes a tandem MIG subsystem with two welding processes and a digitally controlled chopper module 20 for each of the two electrodes. In other similar implementations, separate synchronizing controllers 90 may be used for each bug 110 and corresponding pair of welding chopper modules 20, or more than two bugs 110 can be used on a pipe joint, where the various modules 20 can be powered from a single power source 12 in accordance with the invention. FIG. 9 illustrates another exemplary welding system 10 equipped with modules 20 and short circuit welding control modules 40 as described above, wherein the modules 40 may be integrated within the chopper modules 20. This configuration may be used for performing a root pass of an open root pipe joint using advanced short circuit welding techniques, as described above with respect to FIGS. 2-2F in which each bug 100 operates around a portion of the circumference of the pipe joint in creating the root bead. In other similar systems, more than two bugs 110 can be used, for instance, in welding large diameter pipe sections together, with the addition of corresponding welding modules 20, wherein the features of the invention facilitate ease of adaptation of modular system components to varying welding site requirements.

Figure 10A:
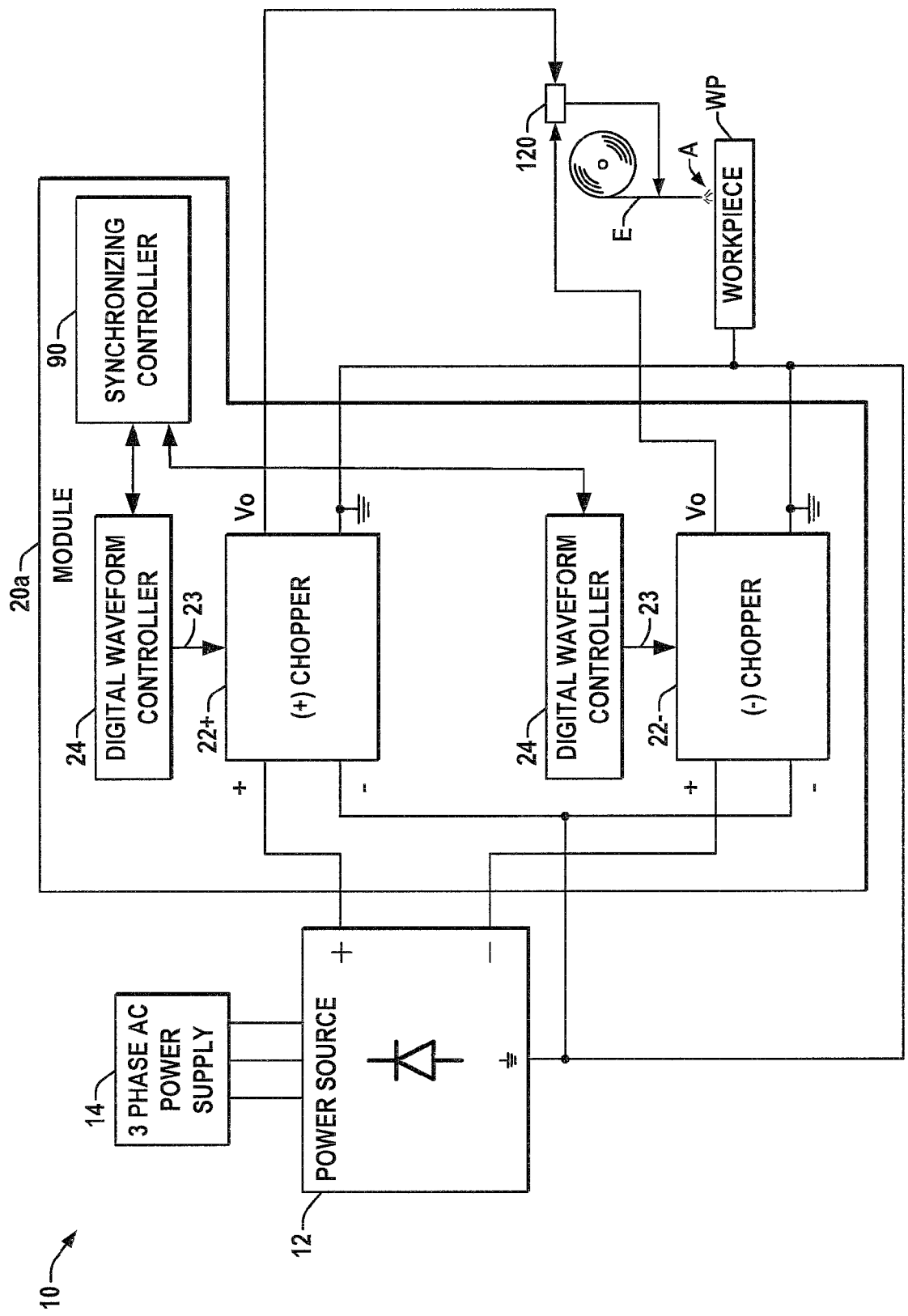
FIG. 10A is a schematic diagram illustrating another embodiment of a DC plus, DC minus, or variable polarity welding system, including a dual chopper module having first and second choppers and corresponding digital waveform controllers, as well as an integrated synchronizing controller in accordance with the invention.
Figure 10B:
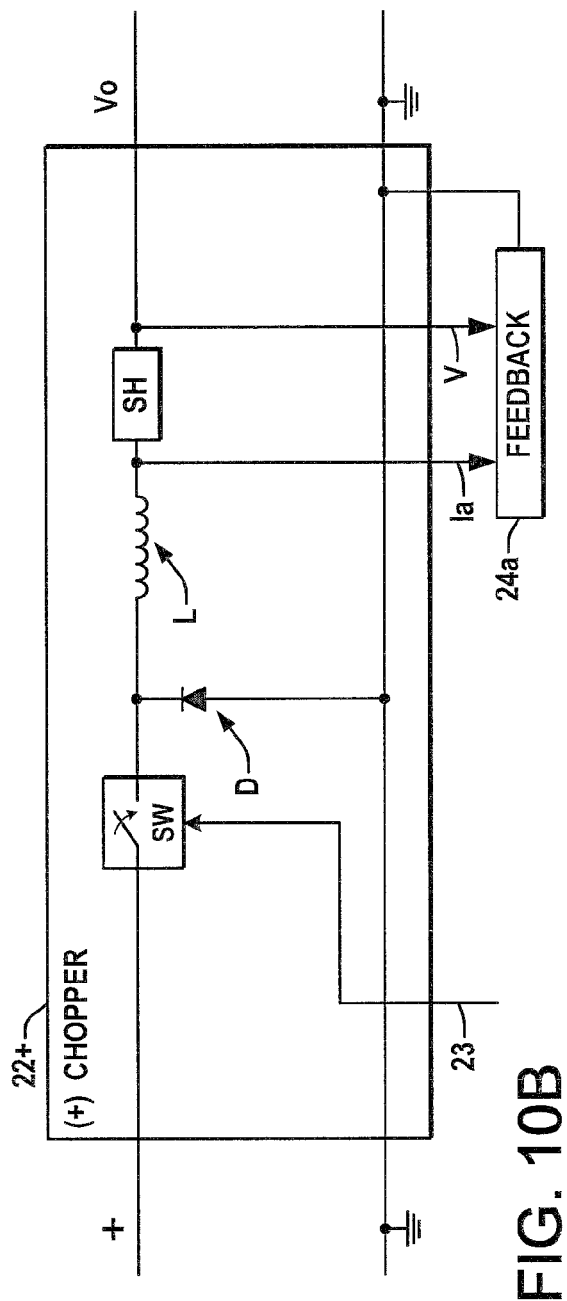
FIG. 10B is a schematic diagram illustrating an exemplary positive chopper converter that may be employed in various embodiments of the invention.
Figure 10C:
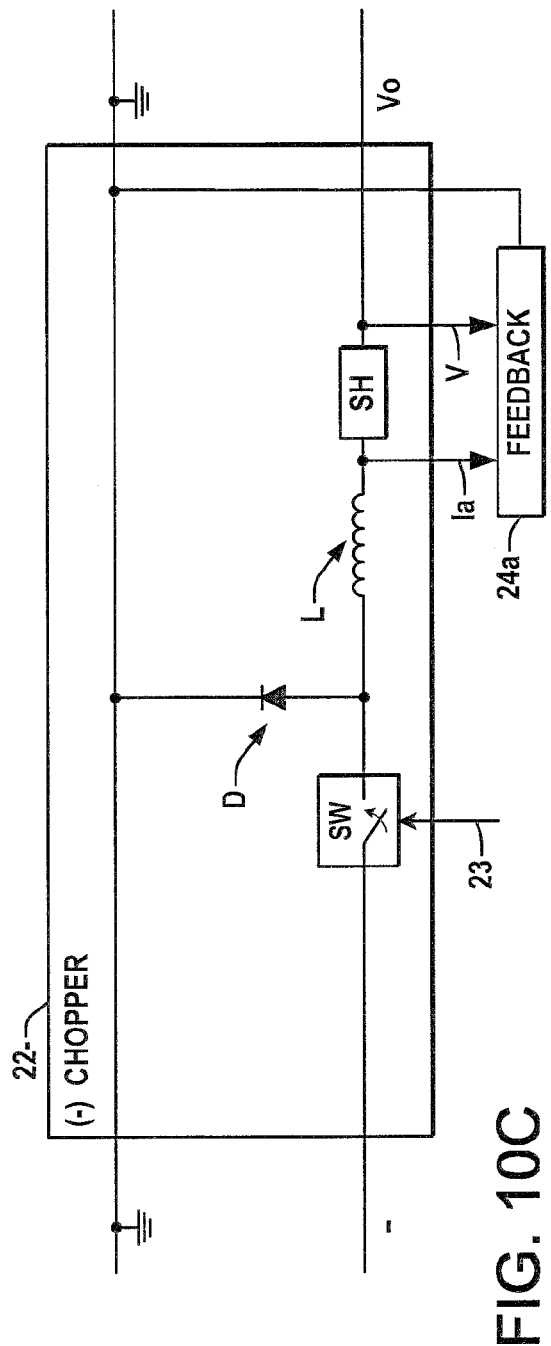
FIG. 10C is a schematic diagram illustrating an exemplary negative chopper converter that may be employed in various embodiments of the invention.

FIGS. 10-10C illustrate the use of two digitally controlled single polarity chopper modules 20 of the invention in providing DC+, DC−, or variable polarity welding, in which one module 20 is configured as a positive module including a positive chopper 22+ (FIGS. 10, 10A, and 10B) and the other is setup as a negative module with a negative chopper 22− (FIGS. 10, 10A, and 10C), with synchronizing controller 90 coordinating the provision of either positive or negative welding signals to the welding process. As shown in FIG. 10B, the positive chopper 22+ of the positive module 20 provides for controlled application of positive current and voltage to the welding process relative to the ground terminal via output Vo through operation of switch SW in the positive (+) supply path. An exemplary negative chopper 22− is illustrated in FIG. 10C, wherein a switch SW is positioned in the negative supply path (−) for controlling negative current and application of negative polarity voltages at the output Vo relative to the ground terminal. As shown in FIG. 10, the exemplary system 10 provides the first chopper module 20 (positive chopper) coupled with the positive output terminal of the DC power source 12 and the second module 20 (negative chopper) coupled to the negative power source terminal, with the workpiece WP being connected to ground and to the ground terminal of power source 12. In this configuration, a pair of diodes or other current splitting device is used to couple the welding signal outputs of the modules 20 to a single welding electrode. In one implementation, the modules 20 can be equipped with integrated (or separate) short circuit modules 40 as described above, so as to provide for dual polarity or switchable polarity advanced short circuit welding capabilities, for instance, as described in Stava U.S. Pat. No. 6,051, 810 incorporated by reference, wherein such applications illustrate the high degree of flexibility provided by the modules 20 of the invention. FIG. 10A illustrates a related embodiment, in which the system 10 includes a dual chopper module 20a capable of implementing DC plus, DC minus, or variable polarity welding in a distributed system 10, where a single power source 12 can be used in configuring systems having any number of such dual or multiple chopper modules 20a. The multiple chopper module 20a shown in FIG. 10A, includes first and second (e.g., positive and negative) choppers 22+ and 22−, respectively, and corresponding digital waveform controllers 24, as well as an integrated synchronizing controller 90 as described above, which are integrated into a single device or machine, which can provide a maximum rated output current of about 300 amps or more for each chopper 22.

Yet another embodiment is shown in FIG. 11, wherein distributed welding system 10 includes two pairs of positive and negative chopper modules 20 with a single integrated synchronizing controller 90 for performing a dual arc tandem welding process on a workpiece WP. In this manner, the advantages of digital waveform control of chopper converters 22 and of distributed power are combined with the variable polarity welding concepts of Stava U.S. Pat. No. 6,051,810 in a multiple arc welding operation for tandem submerged arc welding (SAW) with suitable welding waveforms being programmed and selected in the individual digital controllers of the modules 20. Furthermore, such a system can be constructed using two of the dual chopper modules 20a illustrated in FIG. 10A above, or a single machine could be provided with four choppers (e.g., two positive and two negative) and associated digital controllers to implement such a dual polarity enabled tandem welding process. Yet another application for this type of modular distributed system 10 is shown in FIG. 12, wherein two pairs of positive and negative chopper modules 20 are provided with a single integrated synchronizing controller 90 and a single DC supply 12 for performing two TIG welding operations in accordance with the invention, wherein tungsten welding electrodes E may be used alone, or may optionally be combined with supplies of filler wire 130 directed to the welding arc established between the electrode E and the workpiece WP, wherein the optional filler wire 130 is shown in dashed line in the FIG. 12.

The invention has been illustrated and described above with respect to one or more exemplary implementations or embodiments, although equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the illustrated implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

Having thus described the invention, the following is claimed:

1. A welding system, comprising:
 a power source receiving AC input power and providing a first DC output signal unregulated with respect to a welding process;
  a first welding module coupled with said power source, said first welding module including:
   a first transformerless down-chopper receiving said first DC output signal and providing a first electrical welding signal waveform including a rapid succession of individual pulses that define said first waveform to establish a first welding arc in a first welding process according to a pulse width modulated first switching signal, and
   a first digital waveform controller receiving at least one welding process feedback measurement and providing said pulse width modulated first switching signal according to a desired first waveform; and
  a second welding module coupled with said power source, said second welding module including:
   a second transformerless down-chopper receiving said first DC output signal and providing a second electrical welding signal waveform including a rapid succession of individual pulses that define said second waveform to establish a second welding arc in a second welding process according to a pulse width modulated second switching signal, and
   a second digital waveform controller receiving at least one welding process feedback measurement and providing said pulse width modulated second switching signal according to a desired second waveform.

2. A system as defined in claim 1, further comprising a short circuit welding control module coupled to receive said first electrical welding signal waveform from said first welding module, said short circuit welding control module having:
 means for sensing an anticipated metal breaking fuse condition in said first welding process; and
 means for selectively reducing current to said first welding process according to said anticipated fuse condition.

3. A welding system as defined in claim 1, further comprising a synchronizing controller adapted to synchronize said first and second digital waveform controllers.

4. A welding system as defined in claim 1, wherein said first and second down-choppers each have a maximum rated output current of about 300 amps or more.

5. A welding system as defined in claim 1, wherein said welding modules each weigh about 100 pounds or less.

6. A welding system as defined in claim 2, further comprising:
 a polarity switching system coupled to receive said first electrical welding signal waveform from said first welding module, said polarity switching system having:
  switching means operative in a first state to provide current of a first polarity from said first electrical signal to said first welding process and in a second state to provide current of a second opposite polarity from said first electrical signal to said first welding process; and
 a polarity controller providing a polarity signal to said switching means to selectively place said switching means in one of said first and second states.

7. A welding system as defined in claim 3, wherein said synchronizing controller is integrated into said first welding module.

8. A welding system, comprising:
 a power source with a positive output terminal, a negative output terminal, and a ground terminal, said power source providing a DC output signal at said output terminals unregulated with respect to a welding process with a voltage of said positive output terminal being higher than a voltage of said ground terminal and with said voltage of said ground terminal being between said voltage of said positive output terminal and a voltage of said negative output terminal;

a first transformerless down-chopper coupled to said positive output terminal, said first down-chopper providing a first electrical welding signal waveform including a rapid succession of individual pulses that define said first waveform in a welding process according to a pulse width modulated first switching signal;

a first digital waveform controller receiving at least one welding process feedback measurement and providing said pulse width modulated first switching signal according to a desired first waveform;

a second transformerless down-chopper coupled to said negative output terminal, said second down-chopper providing a second electrical welding signal waveform including a rapid succession of individual pulses that define said second waveform in said welding process according to a pulse width modulated second switching signal;

a second digital waveform controller receiving at least one welding process feedback measurement and providing said pulse width modulated second switching signal according to a desired second waveform; and a synchronizing controller adapted to synchronize said first and second digital waveform controllers.

9. A welding system as defined in claim 8, wherein said first down-chopper and said first digital waveform controller are integrated into a first welding module, and wherein said second down-chopper and said second digital waveform controller are integrated into a second welding module.

10. A welding system as defined in claim 8, wherein said down-choppers each have a rated maximum output current rating of about 300 amps or more.

11. A welding system as defined in claim 8, wherein said welding modules each weigh about 100 pounds or less.

12. A welding system as defined in claim 8, wherein said first and second down-choppers, said first and second digital waveform controllers, and said synchronizing controller are integrated into a welding module.

13. A welding system as defined in claim 9, wherein said synchronizing controller is integrated into one of said welding modules.

14. A distributed welding system with advanced waveform control comprising:
(a) a power source receiving AC input power and providing a first DC output signal unregulated with respect to a welding process, the power source having a positive output terminal, a negative output terminal, and a ground terminal, where a voltage of the positive output terminal is higher than a voltage of the ground terminal and where a voltage of the ground terminal is higher than a voltage of the negative output terminal;
(b) a plurality of independently operable welding modules coupled to the power source and receiving the first DC output signal from the power source, the plurality of welding modules each receiving only the first DC output signal and each providing an electrical welding signal waveform including a rapid succession of individual pulses that define the electrical welding signal waveform to establish a DC welding arc in a welding process according to a pulse width modulated switching signal;
(d) each welding module including
(i) a down-chopper receiving the first DC output signal and providing the electrical welding signal waveform, the down-chopper being a transformerless controllable DC-DC switching converter responsive to the pulse width modulated switching signal,
(ii) a digital waveform controller receiving at least one welding process feedback measurement and providing the pulse width modulated switching signal according to a desired waveform, where the at least one welding process feedback measurement is obtained within the welding module and is indicative of a parameter of the welding arc,
(iii) a short circuit welding control system receiving the electrical welding signal waveform including
means for sensing an anticipated metal breaking fuse condition in the welding process, and
means for selectively reducing current to the welding process according to the anticipated metal breaking fuse condition, and
(iv) a polarity switching system receiving the electrical welding signal waveform including switching means operative in a first state to provide current of a first polarity from the electrical welding signal waveform to the welding process and in a second state to provide current of a second polarity from the electrical welding signal waveform to the welding process, and a polarity controller providing a polarity signal to said switching means to selectively place said means in one of the first and second states; and
(e) a synchronizing controller being integrated into at least one of the plurality of welding modules and synchronizing the digital waveform controllers of at least two welding modules.

15. A welding module as defined in claim 14, wherein said down-chopper has a maximum rated output current of about 300 amps or more.

16. A welding module as defined in claim 14, wherein said welding module weighs about 100 pounds or less.

* * * * *